United States Patent
Fontoura et al.

(10) Patent No.: US 9,483,568 B1
(45) Date of Patent: Nov. 1, 2016

(54) INDEXING SYSTEM

(71) Applicant: GOOGLE INC., Mountain View, CA (US)

(72) Inventors: Marcus Fontoura, Mountain View, CA (US); Daniel N. Meredith, San Francisco, CA (US); Douglas Lee Taylor Rohde, Briarcliff Manor, NY (US); Mahesh S. Palekar, Sunnyvale, CA (US); Asim Shankar, Mountain View, CA (US); Denis Murray Baylor, Cupertino, CA (US); Zigmars Rasscevskis, Zurich (CH); Andras Csomai, San Francisco, CA (US)

(73) Assignee: Google Inc., Mountain View, CA (US)

( * ) Notice: Subject to any disclaimer, the term of this patent is extended or adjusted under 35 U.S.C. 154(b) by 390 days.

(21) Appl. No.: 14/107,851

(22) Filed: Dec. 16, 2013

Related U.S. Application Data

(60) Provisional application No. 61/831,487, filed on Jun. 5, 2013.

(51) Int. Cl.
*G06F 17/30* (2006.01)

(52) U.S. Cl.
CPC ..... *G06F 17/3087* (2013.01); *G06F 17/30625* (2013.01); *G06F 17/30864* (2013.01)

(58) Field of Classification Search
USPC ................. 707/609, 711, 737, 741
See application file for complete search history.

(56) References Cited

U.S. PATENT DOCUMENTS

| | | |
|---|---|---|
| 5,321,833 A | 6/1994 | Chang et al. |
| 5,495,567 A | 2/1996 | Iizawa et al. |
| 5,523,946 A | 6/1996 | Kaplan et al. |
| 5,638,543 A | 6/1997 | Pedersen et al. |
| 5,694,593 A | 12/1997 | Baclawski |
| 5,696,962 A | 12/1997 | Kupiec |
| 5,724,571 A | 3/1998 | Woods |
| 5,754,939 A | 5/1998 | Herz et al. |
| 5,771,378 A | 6/1998 | Holt et al. |
| 5,826,261 A | 10/1998 | Spencer |

(Continued)

FOREIGN PATENT DOCUMENTS

WO 2009/033098 A1 3/2009

OTHER PUBLICATIONS

US 7,430,556, 09/2008, Patterson (withdrawn)

(Continued)

*Primary Examiner* — Cam-Linh Nguyen
(74) *Attorney, Agent, or Firm* — Brake Hughes Bellermann LLP

(57) ABSTRACT

A hybrid-sharded index includes document-sharded posting lists and term-sharded posting lists. Implementations include systems and methods using a distributed hybrid-sharded index. For example, a method may include receiving, at a root node, a query having a first term and a second term and determining, that the first term is term-sharded. The method may also include retrieving a term-sharded posting list for the first term from a first leaf node that stores the term-sharded posting list and determining, at the root node, a second leaf node that stores a document-sharded posting list for the second term. The method may include sending the second term and a sub-set of documents from the term-sharded posting list to the second leaf node, the sub-set being documents assigned to the second leaf node; and generating a search result using a response received from the second leaf node.

23 Claims, 9 Drawing Sheets

(56) References Cited

U.S. PATENT DOCUMENTS

| | | |
|---|---|---|
| 5,835,087 A | 11/1998 | Herz et al. |
| 5,852,820 A | 12/1998 | Burrows |
| 5,864,863 A | 1/1999 | Burrows |
| 5,913,207 A | 6/1999 | Chaudhuri et al. |
| 5,915,249 A | 6/1999 | Spencer |
| 5,920,854 A | 7/1999 | Kirsch et al. |
| 5,956,722 A | 9/1999 | Jacobson et al. |
| 5,960,383 A | 9/1999 | Fleischer |
| 5,963,965 A | 10/1999 | Vogel |
| 5,983,216 A | 11/1999 | Kirsch et al. |
| 6,021,409 A | 2/2000 | Burrows |
| 6,070,158 A | 5/2000 | Kirsch et al. |
| 6,085,186 A | 7/2000 | Christianson et al. |
| 6,098,034 A | 8/2000 | Razin et al. |
| 6,178,419 B1 | 1/2001 | Legh-Smith et al. |
| 6,185,550 B1 | 2/2001 | Snow et al. |
| 6,185,558 B1 | 2/2001 | Bowman et al. |
| 6,298,344 B1 | 10/2001 | Inaba et al. |
| 6,349,316 B2 | 2/2002 | Fein et al. |
| 6,363,377 B1 | 3/2002 | Kravets et al. |
| 6,366,911 B1 | 4/2002 | Christy |
| 6,366,933 B1 | 4/2002 | Ball et al. |
| 6,401,060 B1 | 6/2002 | Critchlow et al. |
| 6,415,283 B1 | 7/2002 | Conklin |
| 6,470,307 B1 | 10/2002 | Turney |
| 6,484,166 B1 | 11/2002 | Maynard |
| 6,499,030 B1 | 12/2002 | Igata |
| 6,542,888 B2 | 4/2003 | Marques |
| 6,549,895 B1 | 4/2003 | Lai |
| 6,549,897 B1 | 4/2003 | Katariya et al. |
| 6,571,240 B1 | 5/2003 | Ho et al. |
| 6,594,658 B2 | 7/2003 | Woods |
| 6,596,030 B2 | 7/2003 | Ball et al. |
| 6,606,639 B2 | 8/2003 | Jacobson et al. |
| 6,638,314 B1 | 10/2003 | Meyerzon et al. |
| 6,654,739 B1 | 11/2003 | Apte et al. |
| 6,684,183 B1 | 1/2004 | Korall et al. |
| 6,691,106 B1 | 2/2004 | Sathyanarayan |
| 6,697,793 B2 | 2/2004 | Mcgreevy |
| 6,721,728 B2 | 4/2004 | Mcgreevy |
| 6,741,981 B2 | 5/2004 | Mcgreevy |
| 6,741,982 B2 | 5/2004 | Soderstrom et al. |
| 6,741,984 B2 | 5/2004 | Zaiken et al. |
| 6,769,016 B2 | 7/2004 | Rothwell et al. |
| 6,772,150 B1 | 8/2004 | Whitman et al. |
| 6,778,970 B2 | 8/2004 | Au |
| 6,778,979 B2 | 8/2004 | Grefenstette et al. |
| 6,778,980 B1 | 8/2004 | Madan et al. |
| 6,820,237 B1 | 11/2004 | Abu-Hakima et al. |
| 6,823,333 B2 | 11/2004 | Mcgreevy |
| 6,832,224 B2 | 12/2004 | Gilmour |
| 6,839,682 B1 | 1/2005 | Blume et al. |
| 6,839,700 B2 | 1/2005 | Doyle et al. |
| 6,859,800 B1 | 2/2005 | Roche et al. |
| 6,862,710 B1 | 3/2005 | Marchisio |
| 6,886,010 B2 | 4/2005 | Kostoff |
| 6,910,003 B1 | 6/2005 | Arnold et al. |
| 6,947,930 B2 | 9/2005 | Anick et al. |
| 6,963,867 B2 | 11/2005 | Ford et al. |
| 6,978,274 B1 | 12/2005 | Gallivan et al. |
| 6,981,040 B1 | 12/2005 | Konig et al. |
| 6,983,345 B2 | 1/2006 | Lapir et al. |
| 6,997,793 B1 | 2/2006 | Ito |
| 7,017,114 B2 | 3/2006 | Guo et al. |
| 7,028,026 B1 | 4/2006 | Yang et al. |
| 7,028,045 B2 | 4/2006 | Franz et al. |
| 7,051,014 B2 | 5/2006 | Brill et al. |
| 7,051,023 B2 | 5/2006 | Kapur et al. |
| 7,051,024 B2 | 5/2006 | Fein et al. |
| 7,058,589 B1 | 6/2006 | Leamon et al. |
| 7,085,771 B2 | 8/2006 | Chung et al. |
| 7,089,236 B1 | 8/2006 | Stibel |
| 7,137,062 B2 | 11/2006 | Kaufman et al. |
| 7,137,065 B1 | 11/2006 | Huang et al. |
| 7,139,756 B2 | 11/2006 | Cooper et al. |
| 7,149,748 B1 | 12/2006 | Stephan |
| 7,151,864 B2 | 12/2006 | Henry et al. |
| 7,152,064 B2 | 12/2006 | Bourdoncle et al. |
| 7,155,243 B2 | 12/2006 | Baldwin et al. |
| 7,158,983 B2 | 1/2007 | Willse et al. |
| 7,171,619 B1 | 1/2007 | Bianco |
| 7,194,483 B1 | 3/2007 | Mohan et al. |
| 7,200,802 B2 | 4/2007 | Kawatani |
| 7,206,389 B1 | 4/2007 | Dumoulin et al. |
| 7,240,064 B2 | 7/2007 | Risvik et al. |
| 7,243,092 B2 | 7/2007 | Woehler et al. |
| 7,254,580 B1 | 8/2007 | Gharachorloo et al. |
| 7,263,530 B2 | 8/2007 | Hu et al. |
| 7,328,401 B2 | 2/2008 | Obata et al. |
| 7,346,839 B2 | 3/2008 | Acharya et al. |
| 7,356,527 B2 | 4/2008 | Carmel et al. |
| 7,356,528 B1 | 4/2008 | Amer-Yahia et al. |
| 7,395,501 B2 | 7/2008 | Graham et al. |
| 7,426,507 B1 | 9/2008 | Patterson |
| 7,428,529 B2 | 9/2008 | Zeng et al. |
| 7,454,449 B2 | 11/2008 | Plow et al. |
| 7,483,871 B2 | 1/2009 | Herz |
| 7,506,338 B2 | 3/2009 | Alpern et al. |
| 7,536,408 B2 | 5/2009 | Patterson |
| 7,562,066 B2 | 7/2009 | Kawatani |
| 7,567,959 B2 | 7/2009 | Patterson |
| 7,580,921 B2 | 8/2009 | Patterson |
| 7,580,929 B2 | 8/2009 | Patterson |
| 7,584,175 B2 | 9/2009 | Patterson |
| 7,596,571 B2 | 9/2009 | Sifry et al. |
| 7,627,613 B1 | 12/2009 | Dulitz et al. |
| 7,668,825 B2 | 2/2010 | Vogel et al. |
| 7,673,027 B2 | 3/2010 | Janakiraman et al. |
| 7,693,813 B1 | 4/2010 | Cao et al. |
| 7,702,614 B1 | 4/2010 | Shah et al. |
| 7,702,618 B1 | 4/2010 | Patterson |
| 7,743,379 B2 | 6/2010 | Mathews et al. |
| 7,917,528 B1 | 3/2011 | Dave et al. |
| 7,925,655 B1 | 4/2011 | Power et al. |
| RE42,728 E | 9/2011 | Madrane |
| 8,086,594 B1 | 12/2011 | Cao et al. |
| 8,090,723 B2 | 1/2012 | Cao |
| 8,166,021 B1 | 4/2012 | Cao et al. |
| 8,166,045 B1 | 4/2012 | Mazumdar et al. |
| 8,224,861 B2 | 7/2012 | Shinjo et al. |
| 8,402,033 B1 | 3/2013 | Mazumdar et al. |
| 8,600,975 B1 | 12/2013 | Cao et al. |
| 8,682,901 B1 | 3/2014 | Cao et al. |
| 8,818,971 B1 | 8/2014 | Fontoura et al. |
| 8,943,067 B1 | 1/2015 | Cao et al. |
| 9,223,877 B1 | 12/2015 | Cao et al. |
| 2001/0000356 A1 | 4/2001 | Woods |
| 2001/0021938 A1 | 9/2001 | Fein et al. |
| 2002/0042707 A1 | 4/2002 | Zhao et al. |
| 2002/0042793 A1 | 4/2002 | Choi |
| 2002/0046018 A1 | 4/2002 | Marcu et al. |
| 2002/0049753 A1 | 4/2002 | Burrows |
| 2002/0052901 A1 | 5/2002 | Guo et al. |
| 2002/0065857 A1 | 5/2002 | Michalewicz et al. |
| 2002/0078090 A1 | 6/2002 | Hwang et al. |
| 2002/0091671 A1 | 7/2002 | Prokoph |
| 2002/0138467 A1 | 9/2002 | Jacobson et al. |
| 2002/0143524 A1 | 10/2002 | O'Neil et al. |
| 2002/0147578 A1 | 10/2002 | O'Neil et al. |
| 2002/0174113 A1 | 11/2002 | Kanie et al. |
| 2002/0184380 A1 | 12/2002 | Weider et al. |
| 2002/0188587 A1 | 12/2002 | Mcgreevy |
| 2002/0188599 A1 | 12/2002 | Mcgreevy |
| 2002/0194184 A1 | 12/2002 | Baskins et al. |
| 2003/0031996 A1 | 2/2003 | Robinson |
| 2003/0037041 A1 | 2/2003 | Hertz |
| 2003/0051214 A1 | 3/2003 | Graham et al. |
| 2003/0069877 A1 | 4/2003 | Grefenstette et al. |
| 2003/0078913 A1 | 4/2003 | Mcgreevy |
| 2003/0093790 A1 | 5/2003 | Logan et al. |
| 2003/0101183 A1 | 5/2003 | Kabra et al. |
| 2003/0130993 A1 | 7/2003 | Mendelevitch et al. |
| 2003/0135495 A1 | 7/2003 | Vagnozzi |
| 2003/0144995 A1 | 7/2003 | Franz et al. |

(56) References Cited

U.S. PATENT DOCUMENTS

| | | |
|---|---|---|
| 2003/0191627 A1 | 10/2003 | Au |
| 2003/0195877 A1 | 10/2003 | Ford et al. |
| 2004/0006736 A1 | 1/2004 | Kawatani |
| 2004/0034633 A1 | 2/2004 | Rickard |
| 2004/0052433 A1 | 3/2004 | Henry et al. |
| 2004/0064438 A1 | 4/2004 | Kostoff |
| 2004/0068396 A1 | 4/2004 | Kawatani |
| 2004/0133560 A1 | 7/2004 | Simske |
| 2004/0158580 A1 | 8/2004 | Carmel et al. |
| 2004/0186824 A1 | 9/2004 | Delic et al. |
| 2004/0186827 A1 | 9/2004 | Anick et al. |
| 2004/0225667 A1 | 11/2004 | Hu et al. |
| 2004/0260692 A1 | 12/2004 | Brill et al. |
| 2005/0043940 A1 | 2/2005 | Elder |
| 2005/0060295 A1 | 3/2005 | Gould et al. |
| 2005/0060651 A1 | 3/2005 | Anderson |
| 2005/0071310 A1 | 3/2005 | Eiron et al. |
| 2005/0071328 A1 | 3/2005 | Lawrence |
| 2005/0102270 A1 | 5/2005 | Risvik et al. |
| 2005/0154723 A1 | 7/2005 | Liang |
| 2005/0165778 A1 | 7/2005 | Obata et al. |
| 2005/0203924 A1 | 9/2005 | Rosenberg |
| 2005/0216564 A1 | 9/2005 | Myers et al. |
| 2005/0234879 A1 | 10/2005 | Zeng et al. |
| 2005/0256848 A1 | 11/2005 | Alpert et al. |
| 2005/0266926 A1 | 12/2005 | Kesselman et al. |
| 2005/0278620 A1 | 12/2005 | Baldwin et al. |
| 2006/0018511 A1 | 1/2006 | Stam |
| 2006/0018551 A1 | 1/2006 | Patterson |
| 2006/0020571 A1 | 1/2006 | Patterson |
| 2006/0020607 A1 | 1/2006 | Patterson |
| 2006/0031195 A1 | 2/2006 | Patterson |
| 2006/0036593 A1 | 2/2006 | Dean et al. |
| 2006/0053157 A1 | 3/2006 | Pitts |
| 2006/0106792 A1 | 5/2006 | Patterson |
| 2006/0143174 A1 | 6/2006 | Dey et al. |
| 2006/0143714 A1 | 6/2006 | Peterson et al. |
| 2006/0200464 A1 | 9/2006 | Gideoni et al. |
| 2006/0212441 A1 | 9/2006 | Tang et al. |
| 2006/0218123 A1 | 9/2006 | Chowdhuri et al. |
| 2006/0268742 A1 | 11/2006 | Chu et al. |
| 2006/0288047 A1 | 12/2006 | Chron et al. |
| 2006/0294155 A1 | 12/2006 | Patterson |
| 2007/0033165 A1 | 2/2007 | Sheinwald et al. |
| 2007/0050393 A1* | 3/2007 | Vogel ............... G06F 17/30864 |
| 2007/0112755 A1 | 5/2007 | Thompson et al. |
| 2007/0156677 A1 | 7/2007 | Szabo |
| 2008/0005064 A1 | 1/2008 | Sarukkai |
| 2008/0146338 A1 | 6/2008 | Bernard et al. |
| 2008/0195601 A1 | 8/2008 | Ntoulas et al. |
| 2008/0228802 A1 | 9/2008 | Marshall |
| 2008/0306943 A1 | 12/2008 | Patterson et al. |
| 2008/0319971 A1 | 12/2008 | Patterson |
| 2009/0063400 A1 | 3/2009 | Borkar et al. |
| 2009/0070312 A1 | 3/2009 | Patterson |
| 2009/0164437 A1 | 6/2009 | Torbjornsen |
| 2009/0193406 A1 | 7/2009 | Williams |
| 2009/0228528 A1 | 9/2009 | Ercegovac et al. |
| 2010/0161617 A1 | 6/2010 | Cao et al. |
| 2011/0302146 A1 | 12/2011 | Bilenko et al. |
| 2012/0005224 A1* | 1/2012 | Ahrens ............ G06Q 10/10 707/769 |
| 2012/0047188 A9 | 2/2012 | Chron et al. |
| 2012/0078859 A1 | 3/2012 | Vaitheeswaran et al. |
| 2012/0130984 A1 | 5/2012 | Risvik et al. |
| 2012/0179684 A1* | 7/2012 | Alba ............... G06F 17/30631 707/738 |
| 2012/0215785 A1* | 8/2012 | Singh ............... G06F 17/30867 707/741 |
| 2013/0297625 A1 | 11/2013 | Bierner et al. |
| 2014/0351203 A1* | 11/2014 | Kunnatur ............ G06F 17/30312 707/609 |
| 2014/0351204 A1* | 11/2014 | Kunnatur ............ G06F 17/30486 707/609 |
| 2015/0186519 A1* | 7/2015 | Popov ............... G06F 17/30622 707/723 |

OTHER PUBLICATIONS

Ahmed et al., "Word Stemming to Enhance Spam Filtering", available online at <http://citeseerx.ist.psu.edu/viewdoc/download-?doi=10.1.1.59.9479&rep=rep1&type=pdf>, Jul. 30-31, 2004, pp. 1-2.

Ahonen-Myka et al., "Finding Co-Occurring Text Phrases by Combining Sequence and Frequent Set Discovery", Proceedings of the Workshop on Text Mining: Foundations, Techniques and Applications, IJCAI-99, Jul. 31, 1999, pp. 1-9.

Aizawa, A, "An Information-Theoretic Perspective of TF-IDF Measures", Information Processing and Management, vol. 1, Issue 39, 2003, pp. 45-64.

Beitzel et al., "Automatic Web Query Classification Using Labeled and Unlabeled Training Data", Proceedings of the 28th Annual International ACM SIGIR Conference on Research and Development in Information Retrieval, Aug. 15-19, 2005, pp. 581-582.

Broder et al., "Robust Classification of Rare Queries Using Web Knowledge", Proceedings of the 30th Annual International ACM SIGIR Conference on Research and Development in Information Retrieval, 2007, pp. 231-238.

Caropreso et al., "Statistical Phrases in Automated Text Categorization", Internet Publication-Technical Report, available online at <https://www.researchgate.net/profile/Fabrizio_Sebastiani/publication/2407903_Statistical_Phrases_in_Automated_Text_Categorization/links/5510e1ad0cf20352196cc978.pdf>, May 26, 2000, pp. 1-18.

Chang et al., "Performance and Implications of Semantic Indexing in a Distributed Environment.", Proceedings of the 8th International Conference on Information Knowledge Management, 1999, pp. 391-398.

Chen et al., "Automatic Construction of Networks of Concepts Characterizing Document Databases", IEEE Transactions on Systems, Man, and Cybernetics, vol. 22, No. 5, Sep./Oct. 1992, pp. 885-902.

Chen et al., "Automatic Thesaurus Generation for an Electronic Community System", Journal of the American Society for Information Science, vol. 46, No. 3., Apr. 1, 1995, pp. 175-193.

Cheung et al., "An Efficient Algorithm for Incremental Update of Concept Spaces", Advances in Knowledge Discovery and Data Mining Lecture Notes in Computer Science, 2002, 16 pages.

Fetterly et al., "Detecting Phrase-Level Duplication on the World Wide Web", Proceedings of the 28th annual International ACM SIGIR Conference on Research and Development in Information Retrieval (SIGIR '05), Aug. 15-19, 2005, 8 pages.

Garner et al., "Gene Alert—A Sequence Search Results Keyword Parser", IEEE Engineering in Medicine and Biology Magazine, vol. 17, Mar.-Apr. 1998, pp. 119-122.

Gedeon et al., "Hierarchical Co-Occurrence Relations.", IEEE International Conference on Systems, Man, and Cybernetics, vol. 3, Oct. 11-14, 1998, pp. 2750-2755.

House, David, "Save Web Time with WebSumm", MITRE Publications, Jul. 1997, 3 pages.

Jagadeesh et al., "Sentence Extraction Based Single Document Summarization", Workshop on Document Summarization, Mar. 19-20, 2005, 5 pages.

Jing et al., "An Association Thesaurus for Information Retrieval.", Proceedings of RIAO-94, 4th International Conference on Intelligent Multimedia Information Retrieval Systems and Management, Oct. 11-13, 1994, pp. 1-15.

Jones et al., "Interactive Document Summarisation Using Automatically Extracted Keyphrases", Proceedings of the 35th Annual Hawaii International Conference on System Sciences, 2002, pp. 1287-1296.

(56) References Cited

OTHER PUBLICATIONS

Jones et al., "Topic-Based Browsing Within a Digital Library Using Keyphrases", Proceedings of the 4th ACM conference on Digital Libraries, Aug. 11-14, 1999, pp. 114-121.

Kando, Noriko, "Text Structure Analysis as a Tool to Make Retrieved Documents Usable", Proceedings of the 4th International Workshop on Information Retrieval With Asian Languages, Nov. 11, 1999, pp. 1-10.

Leroy et al., "Meeting Medical Terminology Needs—The Ontology-Enhanced Medical Concept Mapper", IEEE Transactions on Information Technology in Biomedicine, vol. 5, No. 4, Dec. 2001, pp. 261-270.

Lin et al., "An Automatic Indexing and Neural Network Approach to Concept Retrieval and Classification of Multilingual (Chinese-English) Documents", IEEE Transactions on Systems, Man and Cybernetics. Part B: Cybernetics, vol. 26, No. 1, Feb. 1, 1996, pp. 75-88.

Mandala et al., "Combining Multiple Evidence From Different Types of Thesaurus for Query Expansion.", Proceedings of SIGIR'99 22nd International Conference on Research and Development in Information Retrieval, Aug. 1999, pp. 191-197.

Nguyen et al., "Mining 'Hidden Phrase' Definitions from the Web.", Proceedings of the Fifth Asia-Pacific Web conference, Apr. 2003, pp. 1-11.

Ntoulas et al., "Detecting Spam Web Pages Through Content Analysis", Proceedings of the 15th International Conference on World Wide Web, May 23-26, 2006, pp. 83-92.

Pretschner et al., "Ontology Based Personalized Search", Proceedings of the 11th IEEE International Conference on Tools with Artificial Intelligence, Nov. 9, 1999-Nov. 11, 1999, IEEE Computational intelligence Society, Chicago IL., USA., Nov. 1999, pp. 391-398.

Schutze et al., "A Cooccurrence-based Thesaurus and Two Applications to Information Retrieval", Information Processing & Management, vol. 33, No. 3, 1997, pp. 307-318.

Shen et al., "Building Bridges for Web Query Classification", Proceedings of the 29th Annual International ACM SIGIR Conference on Research and Development in Information Retrieval, 2006, pp. 131-138.

Shen et al., "Q2c@ust:Our Winning Solution to Query Classification in KDDCUP 2005", SIGKDD Explorations, vol. 7, Issue 2, Dec. 2005, pp. 100-110.

Srinivasan, P., "Optimal Document-Indexing Vocabulary for Medline.", Information Processing & Management, vol. 32(5), Sep. 1996, pp. 503-514.

Stanfill et al., "Information Retrieval on The Connection Machine: 1 to 8192 Gigabytes", Information Processing and Management, vol. 27, No. 4, 1991, pp. 285-310.

Stanfill, C., "Partitioned Posting Files: A Parallel Inverted File Structure for Information Retrieval", Paper presented at the International Conference on Research and Development in Information Retrieval, Sep. 1990, pp. 413-428.

Tomasic et al., "Caching and Database Scaling in Distributed Shared-Nothing Information Retrieval Systems", Stanford University Computer Science Technical Report STAN-CS-92/1456, Dec. 22, 1992, 21 pages.

Tomasic et al., "Caching and Database Scaling in Distributed Shared-Nothing Information Retrieval Systems", ACM, May 1993, pp. 129-138.

Tomasic et al., "Performance of Inverted Indices in Shared-Nothing Distributed Text Document Information Retrieval Systems", IEEE, Jan. 1993, pp. 8-17.

Tomasic et al., "Query Processing and Inverted Indices in Shared-Nothing Text Document Information Retrieval Systems", VLDB Journal, vol. 2, 1993, pp. 243-275.

Tomasic. et al., "Performance of Inverted Indices in Distributed Text Document Retrieval Systems", Stanford University Computer Science Technical Report STAN-CS-92/1434, Jun. 23, 1992, 25 pages.

Yun et al., "Semantic-Based Information Retrieval for Content Management and Security", Computational Intelligence, vol. 19, No. 2, 2003, pp. 87-110.

Sornil et al., "Hybrid Partitioned Inverted Indices for Large-Scale Digital Libraries", Proceedings of the 4th International Conference of Asian Digital Libraries, Bangalore, India, 2001, 11 pages.

* cited by examiner

INDEXING SYSTEM

RELATED APPLICATIONS

This application claims priority under 35 U.S.C. §119 to Provisional Patent Application Ser. No. 61/831,487, entitled "INDEXING SYSTEM" filed Jun. 5, 2013. The subject matter of this earlier filed application is hereby incorporated by reference.

BACKGROUND

Search engines assist users in locating information found in a collection of data, including, for example, web pages, PDFs, word processing documents, images, other types of files, etc. Such files may generally be referred to as documents. In order to quickly and effectively search the various documents for relevant information, search engines may index the contents of the documents and use the index to respond to search queries. The index may be included as part of a repository, which is a processed, encoded, and indexed version of a collection of data. A repository for a large collection of data, such as the Internet, may include billions of documents. Thus, some repositories are distributed amongst many machines, dividing the repository into smaller, more manageable pieces. The index for the repository may be an inverted index that is comprised of posting lists, with each posting list representing a term and documents that contain the term. To represent a document, the posting list typically uses a document identifier or other pointer to the document. The posting list can also include other information, such as a position in which the term appears, or other information about the terms or documents. The index may also include metadata for the posting lists and documents.

In a distributed environment, the index may be divided amongst many machines. The division may be by document or by term. An index divided by document, or document-sharded index, minimizes network traffic between the computing devices but increases input/output (I/O) operations. An index divided by term, or term-sharded index, optimizes I/O operations, but increases network traffic. The purpose and size of the index may generally determine whether an index is term-sharded or document-sharded.

SUMMARY

Implementations combine a document-sharded index with a term-sharded index, balancing I/O operations with network traffic considerations. The system may be a distributed system, with the index stored amongst a number of computing devices, also referred to as leaves. The system may assign indexed documents to a leaf. The indexed documents may be assigned to one of two or more sets, e.g., base documents or extended documents. At indexing time the system may generate posting lists for the terms included in the documents. Whether a term appears in a term-sharded posting list or a document-sharded posting list may be based on the document type in which the term appears. In general, terms appearing in base documents are document sharded and stored on the same machine that the document is assigned to. In general, terms appearing in extended documents are term sharded and may be stored on a machine that differs from the machine to which the document is assigned. In other words, the indexing system may include a subset of documents for which posting lists are on the same leaf as the document and another subset of documents for which posting lists may be stored on other leaves. A root server may keep track of which terms are document sharded as well as which documents are base documents. The system may also include an update process that minimizes index unavailability and facilitates recovery by allowing each leaf to determine which version of a document to serve at query time.

One aspect of the disclosure can be embodied in a system that includes distributed computing devices represented by leaf nodes and memory storing an index of documents, the index being distributed across multiple computing devices, and the documents being assigned to respective computing devices. The documents include a first document in a first set of documents assigned to a first leaf node and a second document in a second set of documents assigned to the first leaf node. The index can include posting lists for at least some terms, including all terms, in the first document that are document sharded and stored in fast memory at the first leaf node. The index can also include posting lists for at least some of the terms, including all the terms, in the second document that are term sharded, the term-sharded posting lists being stored at computing devices other than the first leaf node. The system also includes at least one root computing device that includes at least one processor and memory storing instructions that, when executed by the at least one processor, cause the root computing device map documents to computing devices and map term-sharded terms to computing devices. In some implementations, the memory may store one or more of the mappings. The root computing device also includes memory storing instructions that, when executed by the at least one processor cause the system to use the posting lists to respond to queries.

The system can include one or more of the following features, for example, the posting lists for at least some terms in the second document can be document-sharded rather than term-sharded, and stored on the first leaf node. As another example, accessing posting lists can include, in response to a query having at least a first query term and a second query term, the second query term corresponding to one of the term-sharded terms, retrieving a posting list for the second query term from one of the computing devices, wherein the retrieved posting list indexes occurrences of the second query term in documents stored on multiple different computing devices of the distributed computing devices and retrieving posting lists for the first query term from some of the multiple different computing devices, wherein the retrieved posting lists index occurrences of the first query term in documents that are co-located on the computing device that stores the respective posting list. In such implementations, references to documents in the posting list for the second query term can be organized by computing device to which the documents are assigned. In some implementations, the posting lists for document-sharded term are stored in fast access storage. In some implementations, the terms that are document-sharded from the second document are common terms. In some implementations, each of the term-sharded terms is assigned to a respective leaf node of the leaf nodes.

As another example, the root computing device may also include memory storing instructions that cause the system to generate a search result responsive to accessing the posting lists. Generating the search result can include receiving a query at the root computing device, the query having at least a first query term and a second query term, determining that the second query term is term sharded, obtaining a posting list for the second query term from a computing device to which the second query term is assigned, and sending at least a portion of information in the obtained posting list to at least another computing device for intersection with a posting list for the first query term. In some such implementations, generating a search result can include receiving scores for documents from the another computing device, the documents being relevant to the first query term and identified by the obtained posting list. Also in some such implementations, the another computing device may receive information about (i) the first query term, (ii) the second query term, and (iii) a portion of the posting list for the second query term that was obtained from the computing device to which the second query term is assigned and may use the information to identify documents in the first set relevant to the query and documents in the second set relevant to the query.

Another aspect of the disclosure can be embodied in a data storage system that includes a plurality of leaf computing devices in a distributed system, and a root computing device in communication with the plurality of leaf computing devices. At least one of the leaf computing devices may include memory configured in arrays, at least some of the memory being fast-access memory, and at least some of the memory being disk memory. The at least one leaf computing device may also include processors for accessing the memory and processing posting lists stored in the memory, each array being accessible at least to one or more processors of the at least one leaf computing device. The memory may store documents assigned to the at least one leaf computing device, document-sharded posting lists for terms appearing in or associated with a first set of the documents, the document-sharded posting lists being stored in the fast-access memory. The memory may also store term-sharded posting lists for terms appearing in remaining documents (e.g., not in the first set), the terms being assigned to respective leaf computing devices of the plurality of leaf computing devices regardless of the leaf computing device assignment of documents in which the terms appear, the term-sharded posting lists being stored primarily in the disk memory.

The data storage system can include one or more of the following features. For example, a document portion of the term-sharded posting lists may be pre-split into groups, each group being associated with a respective leaf computing device of the plurality of leaf computing devices, and the root computing device may include at least one processor; and memory storing instructions that, when executed by the at least one processor, cause the root computing device to perform operations. The operations include receiving a query, the query including a first term and a second term, the second term being term-sharded, and retrieving the posting list for the second term from a second leaf computing device of the plurality of leaf computing devices, the second leaf computing device being associated with the second term. The operations also include determining, based on the groups appearing in the posting list for the second term, a set of leaf computing devices to which documents in the posting list for the second term appear, sending a request to the set of leaf computing devices to determine documents responsive to the query, and generating a search result from responses received from responses to the request.

As other examples, terms in the term-sharded posting list can be stored in the fast-access memory when the terms meet a term-popularity threshold, a particular term can have at least one document-sharded posting list and one term sharded posting list, terms failing to meet a minimum posting list length may be included in term-sharded posting lists rather than document-sharded posting lists, and/or terms that meet a term popularity threshold that appear in the remaining documents may be stored in the fast-access memory.

Another aspect of the disclosure can be embodied in a computer-implemented method that includes receiving, using at least one processor of a root node in a distributed environment, a query having a first term and a second term, determining, using the at least one processor of the root node, that the first term is term-sharded, and retrieving a term-sharded posting list for the first term from a first leaf node that stores the term-sharded posting list, the first leaf node being one of a plurality of leaf nodes in the distributed environment. The method may also include determining, using the at least one processor of the root node, a second leaf node from the plurality of leaf nodes that stores a document-sharded posting list for the second term; sending the second term and a sub-set of documents from the term-sharded posting list (e.g., document identifiers in the term-sharded posting list) to the second leaf node, the sub-set being documents assigned to the second leaf node; and generating a search result using a response received from the second leaf node.

The method can include one or more of the following features. For example, the method may also include determining a third leaf node from the plurality of leaf nodes that stores a document-sharded posting list for the second term, sending the second term and a second sub-set of documents from the term-sharded posting list (e.g., documents identifiers in the term-sharded posting list) to the third leaf node, the sub-set being documents assigned to the third leaf node, aggregating, using the at least one processor of the root node, results from the second leaf node and the third leaf node, and generating the search result using the aggregated results. As another example, the term-sharded posting list may include, for a document identified in the term-sharded posting list, an indication of a leaf node from the plurality of leaf nodes that the document is associated with. As another example, determining that the first term is term-sharded may include determining that the first term appears in fewer documents than the second term. In some implementations, the second leaf node may score documents included in the response prior to sending the response to the root node.

In some implementations, the term-sharded posting list is a first term-sharded posting list and the query has a third term and the method may further include determining, using the at least one processor of the root node, that the third term is term-sharded, retrieving a second term-sharded posting list for the third term from a third leaf node that stores the second term-sharded posting list, the third leaf node being a different one of the plurality of leaf nodes in the distributed environment than the first leaf node, and aggregating, using the at least one processor of the root node, the first term-sharded posting list and the second term-sharded posting list to generate the sub-set of documents (e.g., document identifiers), so that the sub-set of documents includes documents from the first term-sharded posting list and the second-term-sharded posting list. In some such implementations the method may also include performing lightweight scoring on documents identified in the first term-sharded posting list and the second term-sharded posting list prior to sending the sub-set of documents to the second leaf node.

Another aspect of the disclosure can be embodied in a method that includes receiving, using at least one processor of a first leaf node in a distributed environment, updates to a hybrid-sharded index, the hybrid-sharded index including document-sharded posting lists and term-sharded posting lists and generating, using the at least one processor of the first leaf node that received an update, replacement posting lists, and change information for a respective second leaf node. The method may also include dividing the replacement posting lists into portions, a portion having associated change information and being associated with a respective one of the second leaf nodes and sending the portions to respective second leaf nodes. At a particular leaf node of the second leaf nodes, the method may include merging, using at least one processor of the particular leaf node, a received portion into an updated posting list portion, swapping the updated posting list portion into memory, and, during the swap, using the change information and the updated posting list portion to respond to a query with an older version of the hybrid-sharded index.

The method may include one or more of the following features. For example, the change information can include an inverse translation table and the inverse translation table may translate new document identifiers to old document identifiers. As another example, the updated posting list portion can include the change information and the change information can include a delete list and an insert list. In some implementations, the method may include ceasing to use the change information when the swap is complete. In some implementations, the dividing can include determining whether a document in the update is in a first set of documents or in a second set of documents, and when the document is in the first set, generating the replacement posting list as a document-sharded posting list, wherein the replacement posting list is an updated posting list, and when the document is in the second set, generating the replacement posting list as a term-sharded posting list and performing the dividing, sending, and merging.

Some implementations of the method may include storing the change information in persistent memory, so that a version of the change information is stored for a period for a batch update and recovering a prior version of the hybrid-sharded index using the stored change information. In some implementations, using the change information includes translating local document identifiers in the updated posting list portion to local identifiers for the prior version.

Another aspect of the disclosure can be embodied in a system that includes distributed computing devices represented as leaf nodes and a root node and an index of documents, the index being distributed across the leaf nodes, the documents being assigned to respective leaf nodes. A first leaf node of the leaf nodes can include memory storing document-sharded posting lists for some or all terms associated with documents in a first set of documents that are assigned to the first leaf node, and memory storing term-sharded posting lists for terms assigned to the first leaf node without regard to leaf node assignments for documents identified in the term-sharded posting lists. The first leaf node also includes at least one processor and memory storing instructions that, when executed by the at least one processor, cause the first leaf node to perform operations including receiving an update for documents assigned to the first leaf node, determining that the update affects the at least one document-sharded posting list and, responsive to the determining, generating an updated document-sharded posting list for the at least one document-sharded posting list. The operations may also include determining that the update affects at posting list for a term assigned to a second leaf node, the term being associated with documents in a second set of documents that are assigned to the first leaf and not in the first set of documents. Responsive to the determining, the operations may include generating change information for the documents associated with the term, generating an updated term-sharded posting list for the term, and providing the change information and the updated term-sharded posting list to the second leaf node.

The system may include one or more of the following features. For example, the term assigned to the second leaf node is a first term and the instructions further include instructions that, when executed, cause the first leaf node to receive an updated term-sharded posting list portion for a second term from a third leaf node, the second term being assigned to the first leaf node and receive an updated term-sharded posting list portion for the second term from a fourth leaf node. The instructions may further include instructions that cause the first leaf node to merge the updated term-sharded posting list portion from the third leaf node with the updated term-sharded posting list portion from the fourth leaf node to generate a new term-sharded posting list for the second term and use the new term-sharded posting list for the second term in responding to queries. In some such implementations, as part of using the new term-sharded posting list for the second term, the instructions further include instructions that, when executed, cause the first leaf node to apply change information for the portion from the fourth node and the portion from the third leaf node to the new term-sharded posting list so that the first leaf node responds to at least some queries with a current version of the term-sharded posting list. The change information may include an inverse translation table and the inverse translation table translates new document identifiers to old document identifiers.

As another example, as part of using the new term-sharded posting list for the second term, the instructions may further include instructions that, when executed, cause the first leaf node to swap the new term-sharded posting list into memory in portions and, during the swap, apply change information for the portion from the fourth leaf node and change information for the portion from the third leaf node to the new term-sharded posting list so that the first leaf node responds to a query with a prior version of the term-sharded posting list. In some such implementations, applying the change information occurs for a majority of queries until the first leaf node notifies the root node that the swap is complete and after swapping the new term-sharded posting list into memory and prior to notifying the root node, the first leaf node responds to a plurality of queries using the new term-sharded posting list without applying the change information. As another example, the instructions further include instructions that, when executed, cause the first leaf node to perform the merging when it is determined that a current version of the term-sharded posting list for the second term is stored in slower access memory.

In some implementations, determining that the update affects the posting list for the term assigned to the second leaf node includes determining that the update affects a document that is not in the first set of documents, determining that the term is associated with the document, and determining that the term fails to meet a popularity threshold. In some such implementations, determining that the update affects the posting list for the term assigned to the second leaf node further includes determining that the term is assigned to the second leaf node by applying a function to an identifier for the term. In some implementations, the updated term-sharded posting list may include an identifier for the first leaf node.

Another aspect of the disclosure may be embodied in a system that includes distributed computing devices represented as leaf nodes and a root node and an index of documents, the index being distributed across the leaf nodes, the documents being assigned to respective leaf nodes. A first leaf node of the leaf nodes can include memory storing document-sharded posting lists for some or all terms associated with documents in a first set of documents that are assigned to the first leaf node and memory storing term-sharded posting lists for terms assigned to the first leaf node without regard to leaf node assignments for documents identified in the term-sharded posting lists. The first leaf node may also include at least one processor and memory storing instructions that, when executed by the at least one processor, cause the first leaf node to receive an update for documents in the first set of documents and, responsive to the receiving, update at least some of the document-sharded posting lists, receive an updated term-sharded posting list portion for a first term from a second leaf node, the first term being assigned to the first leaf node, receive an updated term-sharded posting list portion for the first term from a third leaf node, and generate a new term-sharded posting list for the first term using the portion from the third leaf node and the portion from the second leaf node.

The system may include one or more of the following features. For example, generating the new term-sharded posting list can include concatenating the portion from the second leaf node and the portion from the third leaf node with a portion generated by the first leaf node. As another example, generating the new term-sharded posting list may further include receiving change information from the second leaf node for the portion from the second leaf node and concatenating the change information to the end of the portion from the second leaf node, so that the portion from the second leaf node includes the change information. In some implementations, the portion from the second leaf node includes an identification of the second leaf node that is retained in the new term-sharded posting list.

Another aspect of the disclosure can be embodied on a computer-readable medium having recorded and embodied thereon instructions that, when executed by a processor of a computer system, cause the computer system to perform any of the methods disclosed herein.

One or more of the implementations of the subject matter described herein can be implemented so as to realize one or more of the following advantages. As one example, the hybrid system obtains the right tradeoff between I/O operations, network traffic, and computation by overlaying term-sharded posting lists over the same leaves as the doc-sharded posting lists. Some implementations may also use the information generated during an update to recover from failures, enhancing the system reliability and the system availability. For example, each leaf in the distributed index may be able to apply updates to its posting lists independently of other leaves and verify the updated index before putting the updated index into use.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
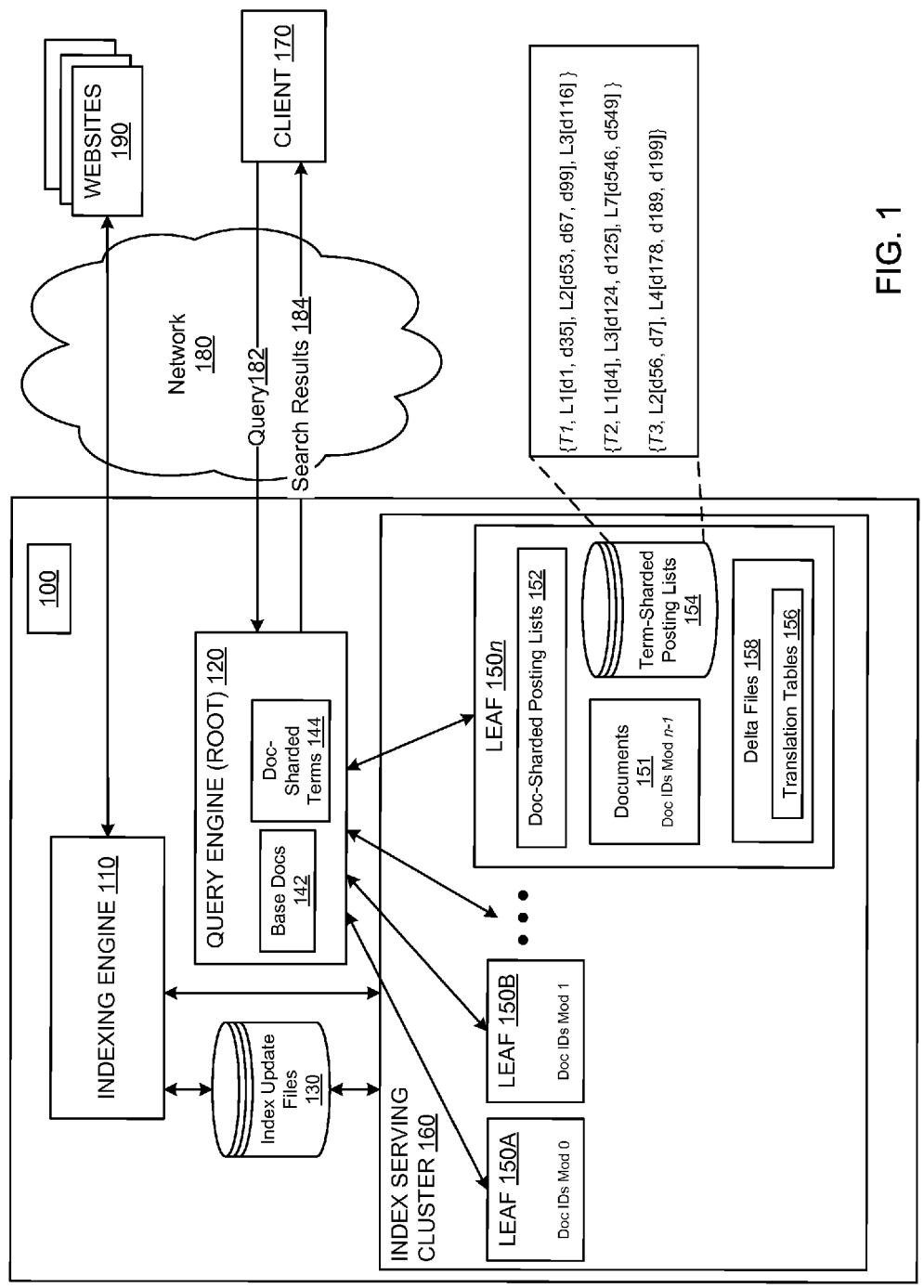
FIG. 1 illustrates an example system in accordance with the disclosed subject matter.

Indexes for large repositories can be divided or sharded into smaller portions and distributed amongst many computing devices. Each portion may correspond to a single computing device or may be a logical view of a computing device (and, e.g., itself partitioned or co-located with other portions). The computing device, whether physical or logical, may be referred to as a leaf node. A document-sharded index divides the documents of the repository amongst the leaves, assigning a document to a leaf and storing posting lists for the terms found in the document on the same leaf as the document. Thus, because a particular term may have a posting list on each leaf, at query time the query server, or root, looks at each leaf to determine which documents contain a query term. This increases input/output operations, so such indexes may generally store the posting lists in fast memory, such as RAM or flash, to improve query response latency, although some posting lists may be stored in disk. On the other hand, although term-sharded indexes may still divide documents amongst leaves, the posting lists for the terms contained in a document need not be on the same leaf as the document. Instead, term-sharded indexes generally assign a term to a leaf, so that the entire posting list for the term can be accessed at one leaf. At query time, the leaf to which a particular term is assigned may contact other leaves, where the documents are stored, to generate search results for a query that includes the particular term. Thus, term-sharded indexes increase network traffic. Some term-sharded indexes store the posting lists in a tiered structure so that some posting lists are stored in disk, some in flash, and some in RAM, etc. For example, rare terms with small posting lists (e.g., a small number of documents that include the term) may be stored on disk. Terms appearing in a moderate amount of documents may be kept in flash, and the terms appearing in many documents may be kept in RAM. At query time, for small posting lists, the query server can generally access one leaf per query term and get the entire posting list for that term. However, as the documents identified in the posting list are not necessarily stored on the same leaf, the posting lists and/or document information is communicated between the leaves to obtain search results. Furthermore, index updates can be complex because one updated document may result in posting list updates at multiple leaves.

Disclosed implementations may combine a document-sharded index with a term-sharded index, balancing I/O operations with network traffic. Such a hybrid-sharded index may divide documents into base documents and extended documents. Base documents may be optimized for network traffic, and the remaining documents may be extended documents. At indexing time the system may split the posting list assignments based on the document in which they appear. In general, terms appearing in base documents may be document-sharded and stored on the same machine that the document is assigned to while posting lists for extended documents may be stored on a machine that differs from the machine to which the document is assigned. A system using such a hybrid-sharded index may coordinate the update of document-sharded portions of the index with term-sharded portions. Some implementations may also include an update process that allows the system to continue serving queries during index updates by allowing a leaf to choose the version of the document to serve at query time.

Figure 9:
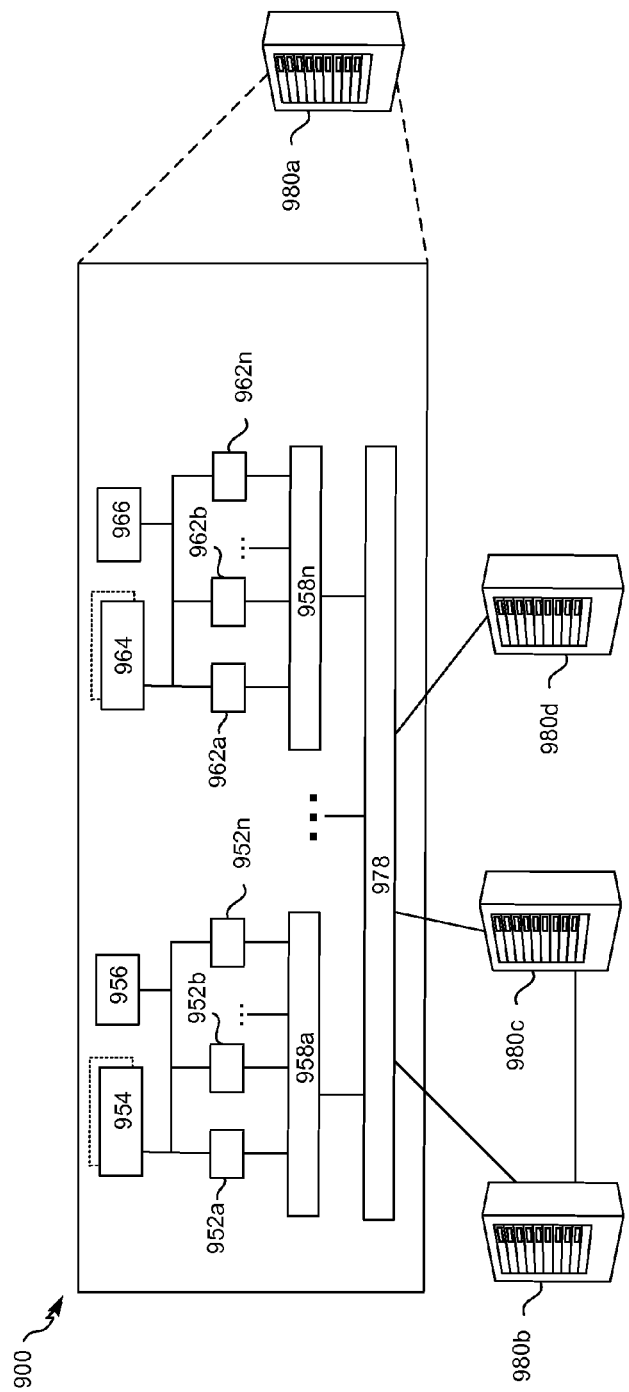
FIG. 9 shows an example of a distributed computer device that can be used to implement the described techniques.

FIG. 1 is a block diagram of a distributed indexing system 100 in accordance with an example implementation. The system 100 may be used to implement a distributed index and search system using the techniques described herein. The depiction of system 100 in FIG. 1 is described as an Internet-based search engine with an inverted index having, by way of example, terms as key-values and lists of document identifiers as non-key values. Documents may include any type of files with content, including web pages, PDF documents, word-processing documents, images, sound files, JavaScript files, etc. Other network configurations and applications of the described technology may be used. For example, the search engine may be used to search local documents, content stored on portable devices, or documents available through other technologies. The search system 100 may receive queries 182 from a client device 170 and return search results 184 in response to the queries. Each query 182 is a request for information. Query 182 can be, for example, text, audio, images, or scroll commands. The search system 100 may include indexing engine 110, query engine 120, and index serving cluster 160. Indexing engine 110, query engine 120, and index serving cluster 160 may be computing devices that take the form of a number of different devices, for example a standard server, a group of such servers, or a rack server system. In some implementations, indexing engine 110 and query engine 120 may be a single system sharing components such as processors and memories. In addition, indexing engine 110 and query engine 120 may be implemented in a personal computer, for example a laptop computer. In some implementations, the indexing engine 110, the query engine 120, and the index serving cluster 160 may be distributed systems implemented in a series of computing devices, such as a group of servers. In some implementations, the servers may be organized into a tree structure, with at least a root server 120 and leaf servers 150A to 150n. In some implementations (not shown), the tree may include intermediate servers, so that there are one or more layers between the root 120 and the leaf servers 150A to 150n. The indexing engine 110, the query engine 120, and index serving cluster 160, may be examples of computer device 900, as depicted in FIG. 9.

The search system 100 illustrated in FIG. 1 operates over a large corpus of documents, such as the Internet, but can likewise be used in more limited collections, such as a library of a private enterprise. In either context, documents are typically distributed across many different computer systems and sites, for example websites 190. Regardless of where each document is located, system 100 may assign each document an identifier, for example a hash of a URL, that uniquely identifies the document. The unique identifier may be known as a global document identifier. Indexing engine 110 can crawl the contents, for example documents, of the web servers to locate newly added content, deleted content, and modified content. When indexing system 110 identifies content, it may use this information to update the search index by creating an index update file 130. Indexing engine 110 may transmit the index update file 130 to the indexing serving cluster 160 so that the system 100 can update the index, as will be explained in more detail below with regard to FIGS. 4-7.

Indexing engine 110 can include one or more processors configured to execute one or more machine executable instructions or pieces of software, firmware, or a combination thereof to create index update files 130. For example, the indexing engine 110 may receive information from websites 190 regarding new, updated, and deleted documents. The indexing engine 110 may assign documents obtained from websites 190 to one of leaf 150A to 150n. Websites 190 may be any type of computing device accessible over the Internet. In some implementations, the assignment may be based on a global document identifier, although other criteria can be used. The indexing engine 110 may generate a list of documents deleted and a list of new documents. An update to a document may be considered a deletion followed by an insertion. Thus, a document appearing on the document delete list and on the document insert list may be considered an updated document. In some implementations the indexing engine 110 may generate one index update file 130 per leaf, so that each leaf receives an update file for the documents assigned to it. In some implementations (not shown) the indexing engine 110 may generate one index update file 130 and the query server 120 may divide the file into several files, one per leaf. The index update file 130 for a leaf may include a list of documents to delete and a list of documents to insert. The documents may be identified in the lists by their global document identifier. In some implementations, the index update file 130 may also include posting lists and scoring information for the documents on the insert list. The index update file 130 may also include other information, such as sort keys and attachment data, etc. In other words, the index update file 130 may include any data or information needed to update a given document on a given leaf, whether deleted, inserted, or updated. Although not shown in FIG. 1 for the sake of brevity, in some implementations, the indexing engine 110 may be one or more separate computing devices.

Like indexing engine 110, query engine 120 may include one or more servers that use the index serving cluster 160 to identify search results for queries 182, for example, using conventional or other information retrieval techniques. Query engine 120 may also be referred to as the root and may include one or more servers that receive queries 182 from a requester, such as client 170. The query engine 120 may also work with index serving cluster 160 to identify documents responsive to the query, and provide information from the responsive documents as search results 184 to the requester. Search results 184 may include information identified from doc-sharded posting lists and term-sharded posting lists. For example, the query engine 120 may work with index serving cluster 160 to identify documents responsive to the query from one or more of leaf 150A, leaf 150B, leaf 150n, etc. The query engine 120 may include a ranking engine that calculates scores for the documents responsive to the query, for example, using one or more ranking signals. The ranking engine may rank the documents found responsive to the query using the scores.

System 100 may also include an index serving cluster 160. Index serving cluster 160 may be a collection of distributed computing devices each with its own processor and memory. The number of computing devices that comprise index serving cluster 160 can vary. The index serving cluster 160 may be divided into one or more leaf nodes, such as leaf 150A, leaf 150B, leaf 150n, with n representing any integer. A leaf node may be a logical division of documents in the corpus, with each document being assigned to a leaf node. Thus, a leaf node may correspond to one computing device, or a leaf node may be a logical computing device and may share a physical computing device with other leaves. In some implementations, a document's assigned leaf may change when the document is updated, making leaf assignments flexible. The root 120 or the indexing engine 110 may determine which documents are assigned to each leaf. The root 120 may route query requests to the leaf nodes and act as the primary means of communication between the leaves at query serving time. In addition to the leaf nodes, the index serving cluster 160 may include one or more layers of nodes between the root node 120 and the leaf nodes, but are not shown in FIG. 1 for the sake of brevity. Thus, for example, an intermediate node may be associated with, for example, 20 leaf nodes. The intermediate node may be connected directly to the root, or there may be one or more additional layers between the intermediate node and the root node. Thus, although FIG. 1 shows communications directly between the root and leaf nodes, it is to be understood that intermediate node(s) may be used to direct communications and aggregate results using known methods, such as remote procedure calls. The root, intermediate, and leaf nodes that make up the tree may, collectively, be referred to as the index.

Each of the leaf nodes that make up index serving cluster 160 can include document-sharded posting lists 152 and term-sharded posting lists 154. Because the posting lists on each leaf 150 are both document-sharded and term-sharded, the system 100 may be referred to as hybrid-sharded. Each leaf 150 may also include documents 151. Documents 151 may be documents assigned to the leaf node. In some implementations document assignment may be a function of a global document identifier for the document. The system 100 may assign a document to a leaf using any method, including round-robin assignment, modulation of the global document identifier, or ranges of the global document identifier. The documents 151 may be stored in memory configured to store one or more pieces of data, either temporarily, permanently, semi-permanently, or a combination thereof. The memory may include any type of storage device that stores information in a format that can be read and/or executed by a processor, including volatile memory, non-volatile memory, or a combination thereof. The documents 151 may be processed, encoded, and scored information for documents from websites 190, rather than a copy of the actual documents.

Document-sharded posting lists 152 may generally represent terms from documents 151 that are considered base documents. Base documents are documents the system 100 optimizes for network traffic rather than I/O operations. In some implementations, document-sharded posting lists 152 may be stored in fast-access memory, such as RAM, flash, cache, etc., to minimize query latency, although not all posting lists need be stored in fast-access memory. The root 120 may store a list 142 of documents that are base documents. The root 120 may also keep a list 144 of terms that are term-sharded, of terms that are document-sharded, or a list for both terms that are term-sharded and terms that are document-sharded. Terms may be single words, n-grams, multiple word phrases, or other word patterns; and likewise restricts (e.g., "is_English", can be treated like terms).

In some implementations, a subset of terms from extended documents are term-sharded. For example, the uncommon terms from extended document are term sharded. For example posting lists for the uncommon terms can be stored on a device remote from an extended document having the respective term. Such posting lists can be stored, e.g., on disk. The posting lists for common terms from extended documents can be stored locally, e.g., on the same device as the respective document in which it occurs. Such posting lists can be stored, e.g., in flash memory or RAM. Accordingly, in some embodiments, the system can include a single posting list for each of at least some uncommon terms. The post listing is stored on a single device based on term-sharding. The system can also include multiple posting lists for each of at least some common terms. For example, one such posting list on each device so that the posting list is co-located on the same device as the documents that it references.

In some implementations the root 120 may be capable of determining which leaf a term is assigned to. In implementations where list 144 is a term-sharded terms list, the list 144 may indicate which leaf a term is assigned to. In other implementations, the term assignment may be a function of an identifier for the term, similar to the assignment of documents to leaves. Thus, each leaf node includes term-sharded posting lists 154 for terms assigned to the leaf. The term-sharded posting lists may be stored in a tiered-structure, such that some of the posting lists may be stored in RAM, some in flash, and the majority on disk. Each leaf may determine the tier associated with a term. In some implementations, terms that appear in over a first predetermined number of documents are assigned to flash, and terms that appear in over a second predetermined number of documents are assigned to RAM, where the second predetermined number is larger than the first predetermined number. In some implementations, terms that appear in over the second predetermined number of documents are both document-sharded and term sharded. For example, the system 100 may create two posting lists for the term. The first posting list may include a subset of the documents that the term appears in, the number of documents in the subset being less than the first predetermined number of documents. This first posting list may be stored on disk and may be term-sharded, or assigned to a particular leaf. The second posting list for the term may be document sharded, so that each leaf that includes a document having the term also has a posting list for that term. Thus, the first posting list may represent an incomplete portion of the posting list for the term, and the entirety of the posting list may be represented by the second posting lists, which are spread across multiple leaves. In some implementations, the second posting lists may be stored in RAM or Flash on a particular leaf node.

Term-sharded posting lists may have a format such as the format shown in FIG. 1. For example, for a term T1, the posting list may be pre-split by leaf, so that the posting list includes an indication of which leaf each document identifier belongs to. In the example of FIG. 1, term T1 includes documents assigned to three leaves—L1, L2, and L3. Documents d1 and d35 are assigned to L1, documents d53, d67, and d99 are assigned to L2, and document d161 is assigned to L3. In some implementations, the document identifiers of posting list 154 may be local document identifiers. For example, each leaf may assign a local document identifier to documents stored on the leaf. In some implementations, the local identifiers may be assigned sequentially, starting with 1. In some implementations, the documents may be sorted, so that identifiers are assigned sequentially to the sorted documents. The local identifier may be smaller than the global identifier assigned to a document, thus saving space in the index.

Leaf nodes 150 may also include translation tables 156 and delta files 158. Translation tables 156 may be generated during an index update and used at query time to allow the leaf to determine whether to serve the query a current version of a document or an updated version of the document. For example, at indexing time the indexing engine 110 may update a batch of documents from a portion of the index. Some of the updated documents may be base documents whose terms are generally document-sharded while the other documents may be extended documents whose terms are generally term-sharded. Thus, the batch of documents updated affects posting lists on multiple leaves in the distributed system 100. The updates may be sent to appropriate leaves, as part of index update files 130, so that if a document is inserted, updated, or deleted, the leaf to which the document is assigned receives an update file 130. To minimize or even eliminate unavailability time for any particular portion of the index, the system may allow queries to execute while the update is taking place. However, a query should be executed against the entirety of a document version or not executed against it at all to maintain document atomicity. Thus the system 100 may coordinate updates between the doc-sharded posting lists 152 and the term-sharded posting lists 154 on each leaf, as well as allow a leaf to decide which version of the document to use.

Figure 3:
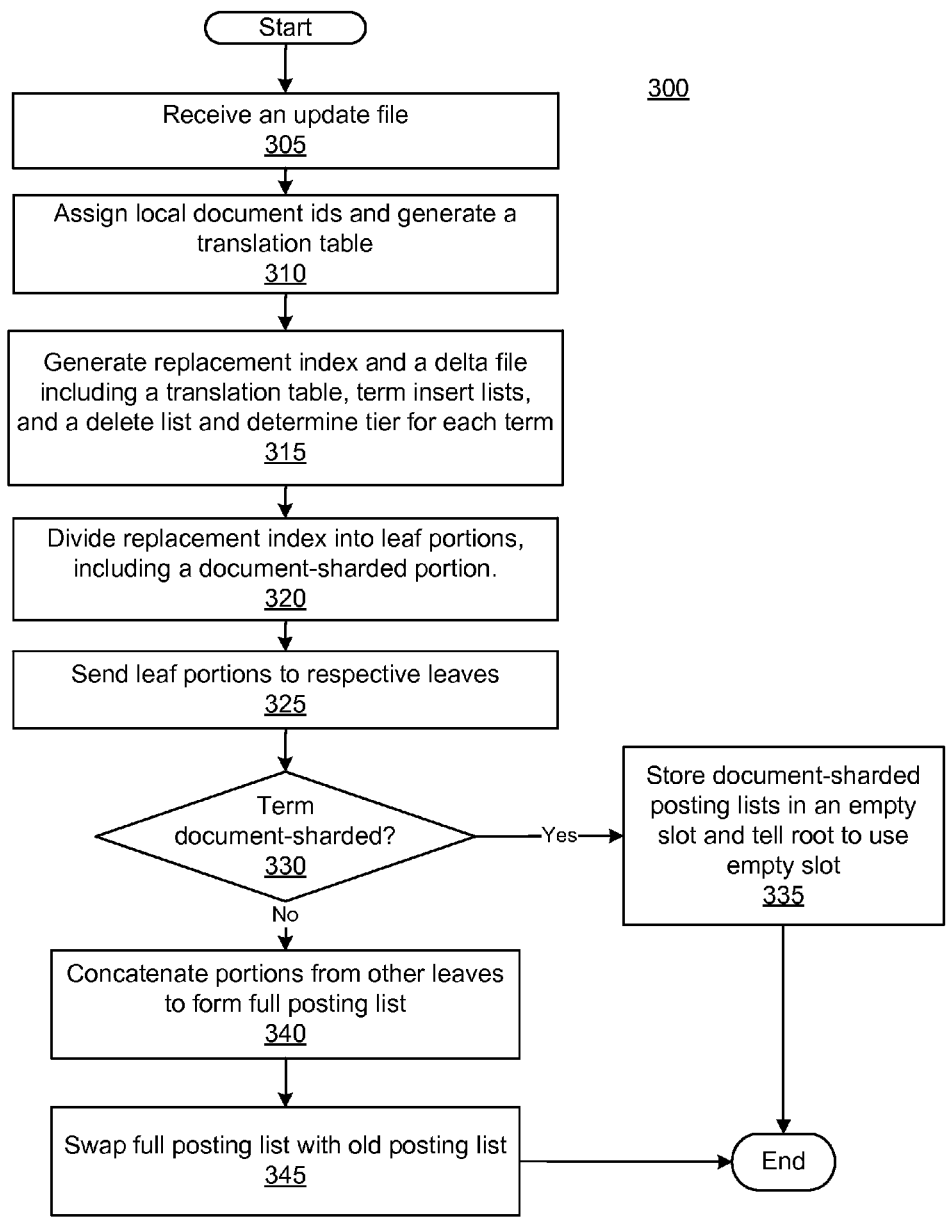
FIG. 3 illustrates an example of update information that can be used to update term-sharded posting lists in a hybrid-sharded, distributed, inverted index.

To accomplish document atomicity, the leaves, at query time, may use a change information file that enables the leaf to choose the prior version of the document or the new version. The change information file, also referred to as a delta file 158, may be created during the update process and include a translation table 156. As explained above, each leaf may assign a local document identifier to documents stored on the leaf sequentially, starting with 1. Because documents may be deleted or added to the leaf with each update, the local identifier of a document may change with each update. To account for this, each leaf may have a translation table 156 for an update, which maps old local document identifiers to new local document identifiers or vice versa, so that during an update a leaf may choose which version of the document to use in responding to a query. The translation table 156 may be either a forward (e.g., old to new) or inverse (e.g., new to old) translation. FIG. 3 illustrates an example of a forward translation table and an inverse translation table for an update on a particular leaf 150*i*. FIG. 1 shows document-sharded posting lists 152, term-sharded posting lists 154, translation table 156, and documents 151 for Leaf 150*n* only for the sake of brevity, and it is understood that each leaf 150 can include each of these components. Furthermore, it is to be understood that the hybrid-sharded index includes the posting lists associated with each of leaves 150A to 150*n*.

Indexing system 110 may be in communication with websites 190 and query engine 120 may be in communication with client(s) 170 over network 180. Network 180 may be for example, the Internet or the network 180 can be a wired or wireless local area network (LAN), wide area network (WAN), etc., implemented using, for example, gateway devices, bridges, switches, and/or so forth. Via the network 180, the indexing system 110 and the query engine 120 may communicate with and transmit data to/from websites 190 and clients 170.

Figure 2:
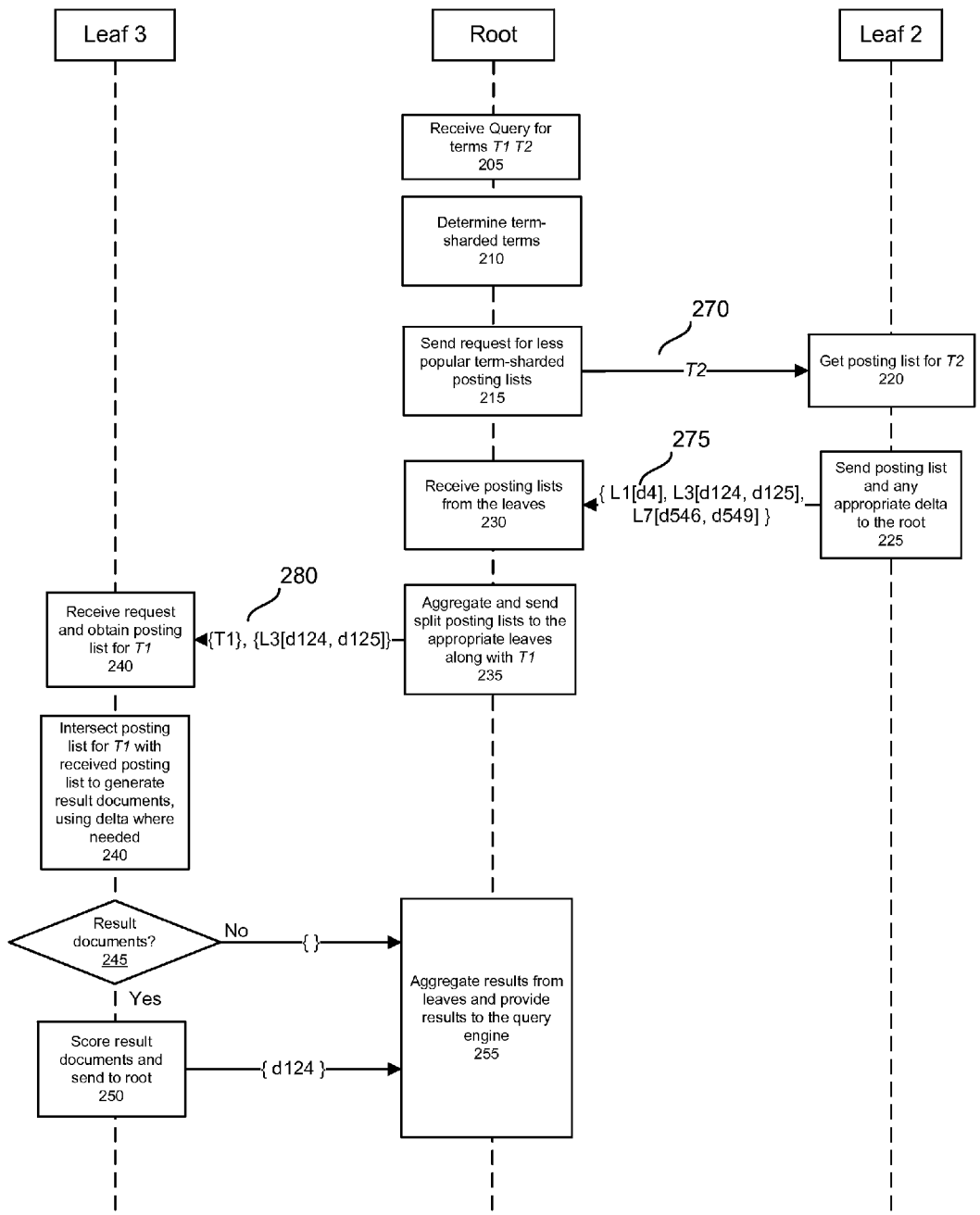
FIG. 2 illustrates an example flow diagram of query processing in a hybrid-sharded, distributed inverted index.

FIG. 2 illustrates an example flow diagram of query processing in a hybrid-sharded, distributed inverted index. The process shown in FIG. 2 may be performed at least in part by a query server, such as query engine 120 shown in FIG. 1, and one or more serving clusters, such as index serving cluster 160 shown FIG. 1. In the example of FIG. 2, the query may include two terms, T1 and T2, where T2 is found in fewer documents than T1. As shown in the example of FIG. 2, at query serving time a query server, or root, may obtain the two query terms (205). The root may be in direct communication with the leaves, or the root may be in indirect communication with the leaves through intermediate servers. For example, in some systems the indexing serving cluster may be a tree with one or two levels between the root and the leaf nodes. The intermediate nodes at the intermediate levels may pass communications from the root node to the leaves and may aggregate any results from the leaves before forwarding to the root. For the sake of brevity, FIG. 2 does not illustrate intermediate nodes, but implementations are understood to include such nodes.

The root node may obtain any term-sharded posting lists first, to obtain the list of documents for terms that appear in fewer documents. The root may include a list of term-sharded query terms or a list of document-sharded query terms. In some implementations, documents not included in the list of document-sharded query terms may be assumed to be term-sharded, and vice versa. The root node may be capable of determining an approximate number of documents that include the term. For example, the list may also include an indication of the number of documents that include the term, the indication being an approximation or an exact number. In some implementations, the tier assignment of a term may be the indication, so that terms assigned to a disk tier appear in fewer documents than a term assigned to a flash tier, and terms assigned to a flash tier appear in fewer documents than terms assigned to a RAM tier, etc. Thus, the root may determine term-sharded query terms and, in some implementations, terms with short posting lists (210). In the example of FIG. 2, query term T2 is term-sharded and has a smaller posting list. Thus, the root node may send a request 270 for the posting list of T2 to the leaf node to which T2 is assigned (215). In the example of FIG. 2, this is Leaf 2. Leaf 2 may receive the request and obtain the posting list for T2. (220). As indicated above, the posting list for T2 may be pre-split by leaf, so that each document in the posting list is associated with a leaf, with all documents assigned to the same leaf grouped together. Leaf 2 may send a response 275 that includes the posting list back to the root (225). In some implementations, the posting list may include one or more delta files, if an update is in progress. A delta file includes information that enables the leaf assigned to a document to determine which version of the document to serve, as will be discussed in more detail below. The root may receive the response with the posting list from L2 (230). If the root requested other term-sharded posting lists, the root may aggregate the information from the returned posting lists, do some lightweight scoring, divide the aggregated information into leaf-specific requests, and send the requests to appropriate leaves (235). Aggregation may involve dividing the posting lists into leaf-specific groups and performing a union or intersection on the document identifiers in each group, depending on the query. In some implementations the posting lists may be pre-split into leaf-specific groups. For example, the posting list of the hybrid-sharded index may include a leaf identifier, so that each document is assigned to a leaf within the posting list. In the example of FIG. 2, the posting list for T2 includes documents assigned to leaves L1, L3, and L7. In some implementations, the document identifiers are local document identifiers assigned by the leaf, rather than a global document identifier.

After receiving the response 275, the root knows which documents are responsive to the more rare term, T2, based on the returned term-sharded posting list. In the example of FIG. 2, the query requests that both terms appear in the document. Thus, the root may use the posting list from Leaf 2 to reduce the number of leaves contacted to obtain the posting list for the document-sharded term T1. For example, the root may determine groups of documents from the term-sharded posting list, determine which leaf is assigned to the documents in each group, and send a request 280 to those leaves. The root node may determine that Leaf 3 is a node that should receive a request and send the request 280 to Leaf 3 (240). Leaf 3 may be chosen because it is assigned to documents that appear in the posting list for T2 returned from Leaf 2. Of course other leaves, such as Leaf 1 and Leaf 7 may also receive a request. In addition to the document identifiers found in the term-sharded posting lists, the request 280 may also include a request to search for documents that include query term T1. Leaf 3 may obtain the document-sharded posting list for T1 (240). The intersection may generate result documents that are responsive to both T1 and T2. In some implementations, the leaves may use a skip table to efficiently identify the documents common to both posting lists. In some implementations, Leaf 3 may apply a delta file to determine which documents are result documents. A delta file is created during an index update and includes information that allows the leaf to convert the updated index back to the older version of the index, as will be explained below in more detail. Using the delta file a leaf may continue to serve queries during an update. When the update is complete, the leaf may ignore any delta files and serve queries without converting the index back to the old version. If no result documents are found (245, No), Leaf 3 may return an empty list to the root node or to an intermediate node, if one exists. If the intersection yields result documents (245, Yes), the Leaf 3 may score the result documents based on one or more scoring factors (250). Leaf 3 may perform a full-scoring of the documents because the leaf has the scoring information stored at the leaf or provided as part of the request 280. Leaf 3 may send a response back to the root that includes the document(s) identified as responsive to the query. The root may aggregate responses it receives from additional leaves, for example Leaf 1 and Leaf 7, and/or perform other scoring passes to refine the search results. The root may then provide the responses to the query requestor (255).

The query processing demonstrated in FIG. 2 optimizes both I/O operations and network traffic. A document-sharded index would ask every leaf to generate a response to the query, requiring a high level of I/O operations. A term-sharded index may involve sending a request to fewer leaves, but the leaves send numerous requests for information to other leaves in order to obtain the information to generate a search result. The hybrid-sharded index leaf machine can be used to minimize I/O operations and network traffic by limiting the number of leaves that respond to a query and allowing leaves to perform full scoring for associated documents responsive to the query.

Updating a Hybrid-Sharded Index

Updates to a purely document-sharded index can be fairly straightforward because updates for a particular document affect one leaf, so no coordination between leaves is needed. Some document-sharded indexes keep a spare leaf for index updates. At indexing time, the system may use the spare leaf to construct new posting lists based on terms found in documents assigned to a leaf being updated. The system may then notify the root node that the formerly spare leaf replaces the leaf being updated. Thus, leaves in a purely document-sharded index can easily swap in the new leaf and mark the old leaf as the spare leaf. But such an update method does not work for a hybrid-sharded index because updates to one document affect posting lists on multiple leaves.

In some implementations, the search system 100 coordinates index updates between leaves. At indexing time the indexing engine may update a batch of documents from a portion of the index. For example, the index may update the documents assigned to a particular leaf. Some of the updated documents may be base documents whose terms are generally document-sharded while the other documents may be extended documents whose terms are generally term-sharded. Thus, the batch of documents updated affects posting lists on multiple leaves in the distributed system. In some implementations the indexing engine may send updates to the root node. The root node may separate the updates by leaf, so that each leaf receives an update file, such as update file 130 of FIG. 1. In some implementations the indexing engine may generate multiple update files 130, one for each leaf. To minimize or even eliminate unavailability time for any particular portion of the index, the system may allow queries to execute while the update is taking place. To accomplish this and maintain document atomicity, meaning a query should be executed against the entirety of a document version or not executed against it at all, some implementations may coordinate updates between the doc-sharded posting lists and the term-sharded posting lists, as well as allow the leaves to decide which version of the document to use. Accounting for updates at query time also enhances recovery capabilities of the system by allowing a portion of the index to serve queries from the updated index before rolling in the entire index, as will be explained in more detail below with regard to FIG. 7. This enables the system to detect and correct errors that may otherwise crash one or more leaves.

FIG. 3 illustrates a flow diagram of an example of a process 300 for updating a hybrid-sharded, distributed inverted index. Process 300 may be performed at a leaf node of an index serving cluster, such as index serving cluster 160 of FIG. 1. Prior to process 300, index updates may have been divided by leaf, so that each leaf receives a portion of the current update to the index. In some implementations, the update may be for a batch of documents that represent some portion of the total documents in the repository. Thus, the update need not represent updates to every document of the indexed corpus. The update file received by a leaf (305) may be for documents assigned to the leaf. The update file may include a list of documents to be deleted and a list of documents to be inserted. The update file may also include content for the documents to be inserted. The content may have been processed, encoded, and scored by the indexing engine. In some implementations the leaf may perform the processing, encoding, and scoring of the content. The update file may include the content or a pointer to the content, so that the leaf node can access the content.

The leaf may assign local document identifiers to the documents (310). The leaf may assign a local identifier to documents currently assigned to the leaf that are on the insert list or are not on the delete list. In other words, the leaf may assign local identifiers to unchanged documents, updated documents, and inserted documents. In some implementations, the local identifiers may be assigned sequentially, starting with zero or 1. In some implementations, the documents may be sorted, so that identifiers are assigned sequentially to the sorted documents. Because documents may be deleted or added to the leaf with each update, the local identifier of a document may change with each update.

Figure 4:
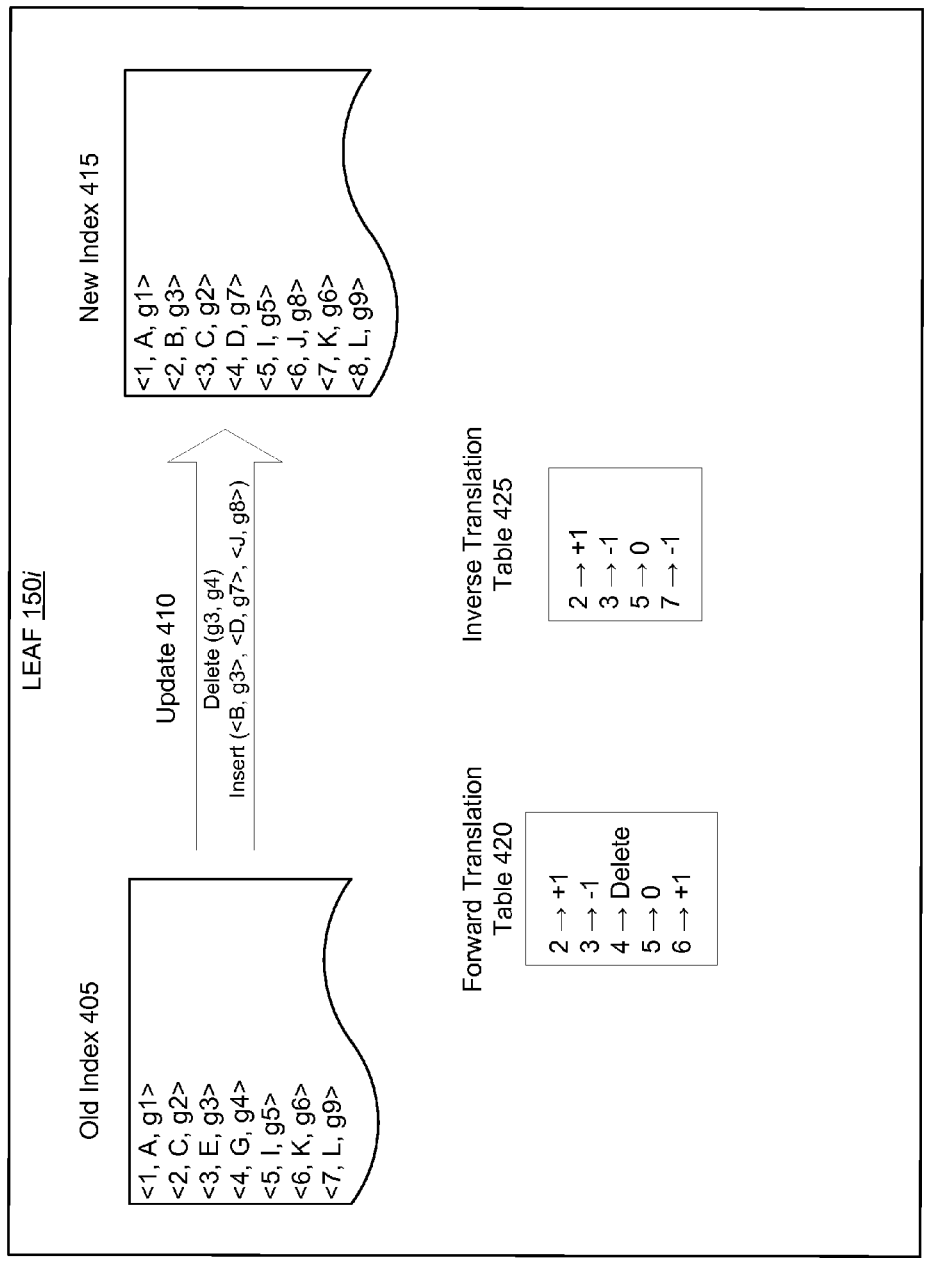
FIG. 4 illustrates a flow diagram of an example of a process for updating a hybrid-sharded, distributed inverted index.

FIG. 4 illustrates an example of update information that can be generated as part of an update and used to update term-sharded posting lists in a hybrid-sharded, distributed, inverted index. FIG. 4 illustrates a portion of an update file 410 that includes a delete list and an insert list. The information in update file 410 may be representative of information found in index update file 130 of FIG. 1, although not all information from update file 130 is shown in FIG. 4 for the sake of brevity. The delete list may include documents that have to be removed from the leaf or updated. The delete list may include global document identifiers. The insert list of update 410 may include a sort field and global document identifier of documents to be added to the leaf. In the example of FIG. 4, document g3 is updated, document g4 deleted, and documents g7 and g8 are added. The leaf 150$i$ may currently have documents with local document identifiers as shown in old index 405. The leaf may apply the update 410 to the old index 405 to generate the new index 415. As demonstrated by FIG. 4, document g2 had local document id 2 in the old index 405 but now has local document id 3 in the new index 415. Document g3 received a new sort order in the update 410 and now has local document id 2.

As part of applying the update 410 to the old index 405, the leaf may generate a translation table. The translation table may map old local document identifiers to new local document identifiers. The translation table may account for changes in a document's local identifier, so that the leaf may continue responding to queries during the update. The leaf may generate a forward translation table or an inverse translation table or both. A forward translation table may convert old local document identifiers to new local document identifiers. In some implementations the forward translation table may take the form of table 420 of FIG. 4. The table 420 of FIG. 4 indicates where in the new index 415 the document has moved. For example, document g1, which has local document identifier 1, did not move, so it has no entry in table 420. Document g2, which had local document identifier 2, moved up one in the new index, and now has a local identifier of 3. Thus, the translation for g2 is +1, which tells the leaf to add one to the old local document identifier to calculate the new local document identifier. If a local document identifier is not listed in the translation table it may be assumed to have the translation factor of the next lowest local document identifier. Thus, in table 420 local document identifier 7 may be assumed to be local document identifier 8 in the new index. Such a format enables the leaf to keep the memory footprint of translation table small. The leaf may also or alternatively generate an inverse translation table 425. The inverse translation table 425 may convert new local document identifiers to an old local document identifier. In some implementations, the inverse translation table may take the form of table 425 of FIG. 4. Like table 420, table 425 may find the highest entry less than or equal to the new document identifier and apply the translation. For example, new local document identifier 8 may be mapped to old document identifier 7 by applying the transformation of −1, associated with new local document identifier 7 in translation table 425.

Returning to FIG. 3, the leaf may generate a replacement index and a delta file (315). The leaf may generate the replacement index by merging the received update with the current index information, using the new local document identifiers. The merge of updates may happen completely in the document major space. A document major space is the local document id space that would be created considering all documents (base and extended) are fully document-sharded. For example, given an existing index on Leaf i of F0 and an update file U0, the replacement index will produce F0' where F0' contains all terms and postings from F0 that were not deleted and from U0, using the new local ids for the documents in a given range of the global document identifier space. The advantages of such a merge include enabling creation of the replacement index by reading the existing index and the delta file for Leaf i. Another advantage is that the range of identifiers considered when inserting new postings into existing posting lists is bounded by the number of documents assigned to the leaf. Furthermore, because the replacement index is complete, terms can easily be shifted between tiers and data for any given term can be distributed to term-sharded posting lists without concern for local id because, for a given version of a given leaf, the local identifiers are guaranteed to be correct.

As part of generating the replacement index, the leaf may also generate a delta file. The delta file is change information for the index and may include the translation table, a delete list, and new posting lists. In general, change information includes any information useful in converting an old version of a posting list into a new version of the posting list or vice versa.

With a replacement index generated, the leaf, for example Leaf i may divide the replacement index into leaf portions, including at least one document-sharded portion (320). For example, terms appearing in documents that are base documents may generally be in posting lists stored on Leaf i. These document-sharded posting lists do not need to be sent to another leaf, regardless of whether the term is assigned to another leaf. Terms that appear in all other documents may be term sharded, and the posting lists may be stored on a leaf other than Leaf i. Thus Leaf i may divide the term-sharded posting lists according to the leaf a term is assigned to. For example, if term T1 is assigned to Leaf A, and term T25 is assigned to Leaf n, Leaf i may divide the replacement index into a portion for Leaf A that includes the posting list of T1 and a portion for Leaf n that includes the posting list of term T25. Of course, Leaf i does not have the full posting list for terms T1 or T25, but only the document identifiers of the documents that include those terms and are assigned to Leaf i.

To generate the full term-sharded posting lists and achieve the hybrid-sharded index structure, the leaf may send the leaf portions to respective leaves and may receive portions from other leaves. As indicated above, any document-sharded posting lists may stay at the leaf while term-sharded posting lists may be divided into portions, each portion corresponding to a leaf. The leaf may append change information associated with the documents in a portion to the end of the portion prior to sending the portion to its intended leaf. The exchange of posting list portions between leaves in the indexing cluster may be referred to as a shuffle. In some implementations, the exchange may be accomplished by writing the posting list portions to a memory location that each leaf can access, with each leaf retrieving its assigned portions from the memory location. In some implementations the leaves may send portions directly to other leaves.

Figure 5:
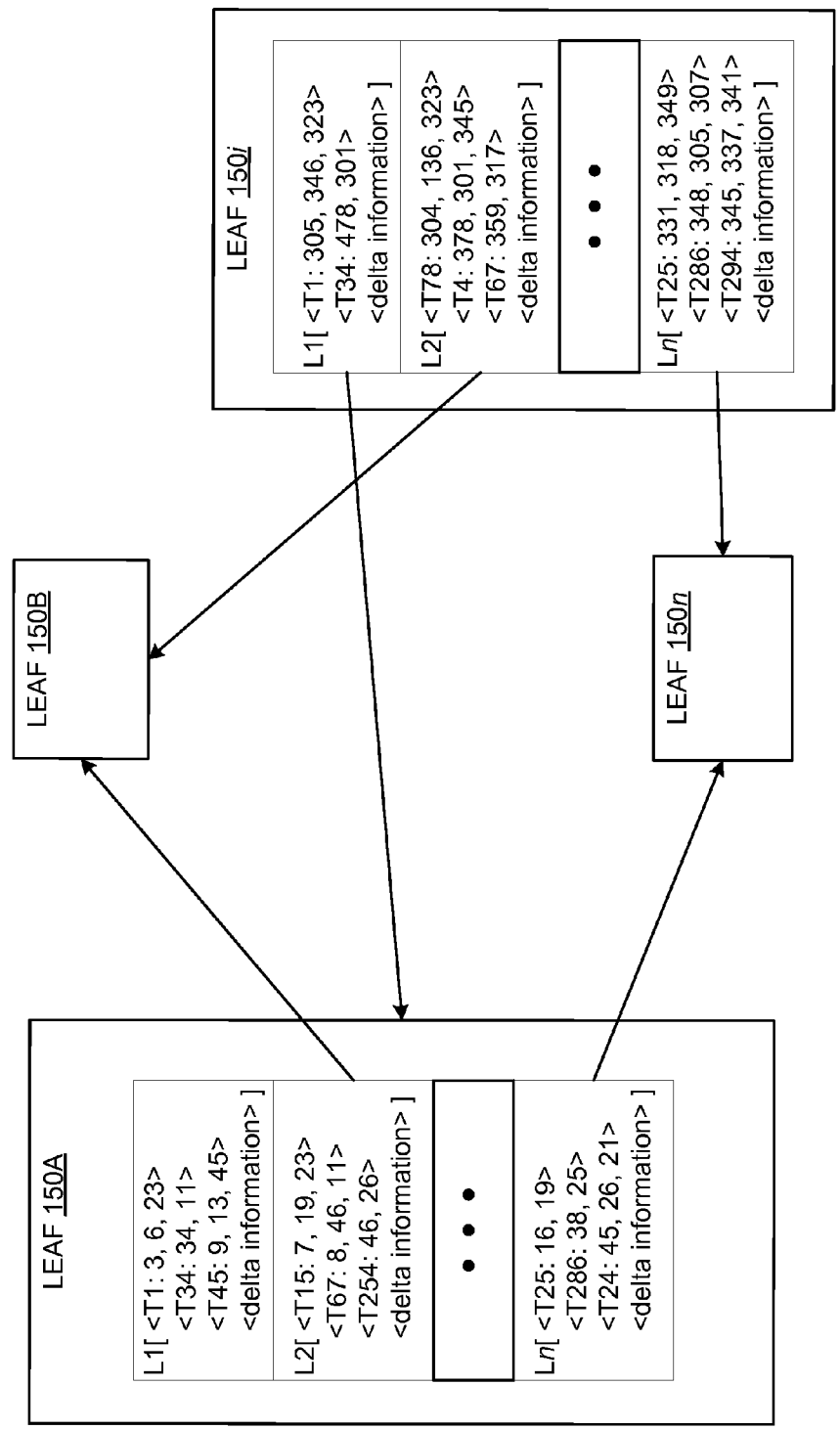
FIG. 5 illustrates an example shuffle of updated term-sharded posting lists.

FIG. 5 illustrates an example shuffle of updated term-sharded posting lists. In the example of FIG. 5, Leaf 150A has divided the term-sharded posting lists into three shown portions, one that stays at Leaf 150A, one intended for Leaf 150B, and one intended for Leaf 150$n$. Likewise, Leaf 150$i$ has posting lists destined for Leaf 150A, Leaf 150B, and Leaf 150n. As shown, Term T1 is assigned to Leaf 150A, so the documents that are assigned to Leaf 150i are in the posting list for term T1 on Leaf 150i. Leaf 150i sends this portion of the posting list to Leaf 150A. Although not shown, Leaves 150B to 150n will also send any term-sharded posting lists for term T1 to Leaf 150A. Similarly, Leaf 150A and Leaf 150i both include posting lists for terms T25 and T286, which are assigned to Leaf 150n. Thus, Leaf 150A and Leaf 150i will send respective portions to Leaf 150n. In addition to the posting list, each portion may also include delta information, as shown in FIG. 5. The delta information may enable the leaf sending the portion, at query time, to choose which version of a document to use in responding to a query. Although only four leaves are illustrated in FIG. 5, it is understood that the swap may involve hundreds or even thousands of leaves.

Returning to FIG. 3, when a leaf has finished sending its portions of the term-sharded posting lists, the leaf may begin updating its index. For document-sharded posting lists (330, Yes), the leaf may store the replacement portion in a spare leaf in memory (335). The replacement portion represents a full replacement of the current document-sharded posting lists for the leaf. When the leaf is ready to start serving the update, the leaf may tell the root to make the spare leaf the active leaf. The leaf may time this notification with updates for its term-sharded posting lists. For example, when the leaf has received or obtained its associated term-sharded portions from the other leaves, the leaf may begin swapping in the next version of the term-sharded portion of the index.

Figure 6:
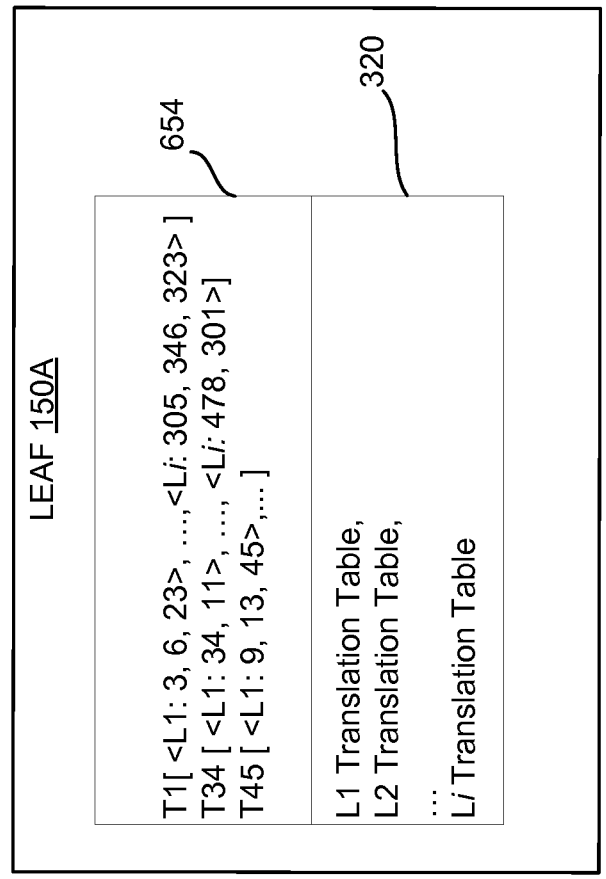
FIG. 6 illustrates an example of a merged term-sharded posting list.

For term-sharded posting lists (330, No), the leaf may merge the posting lists received from the other leaves, forming a complete posting list for a particular term (340). FIG. 6 illustrates an example of a merged term-sharded posting list. In the example of FIG. 6 Leaf 150A has received or retrieved the portion of the posting list sent by Leaf 150i, as shown in FIG. 5. Leaf 150A may merge its portion the posting list for term T1 with the portion sent from Leaf 150i and merge its portion of the posting list for term T34 with the portion sent from Leaf 150i, etc. In some implementations the merge may simply be a concatenation of the posting lists by term. Such a concatenated posting list pre-groups the document identifiers by leaf, so that the posting list itself indicates where the document is stored. Furthermore, the posting list may contain the local document identifiers, which have a smaller memory footprint than global document identifiers.

In some implementations, the leaf may also append the change information, generated during the creation of the replacement index prior to the shuffle, to the end of the posting list. For example, the change information may be at the end of the posting list, as illustrated in FIG. 6, or at the end of document identifiers within the posting list. Thus, during an update the posting list for a term may be understood to include the change information. The change information may be stored with the posting list and sent between leaves at query time. The change information may enable a leaf to serve a query using either the old version or the new version of a document, as will be explained in more detail below. After the update is complete the change information may be ignored. In some implementations the change information may only be appended to posting lists stored on slower-access memory such as disk. This eliminates a separate disk seek to obtain the change information. For posting lists stored in faster-access memory the change information may just be available for access with the posting list. The change information may include an inverse translation table, allowing a leaf to translate the new index into a prior version. Thus, if the change information is ignored the system will serving the new version of the index, and if the change information is applied the system can serve the old version of the index.

After a leaf generates complete posting lists for the terms associated with the leaf, the system may begin swapping the new index for the old (345). As mentioned above, for the document-sharded terms, a leaf may have a copy of the index in a spare leaf, ready for use. When the swap of term-sharded posting lists is complete the leaf may provide an indication that queries are to be served using the new index. The indication may cause the leaf to stop applying the change information to term-sharded posting lists and may cause the root to use the replacement index in the spare leaf and mark the old version of the document-sharded posting lists as the spare leaf. Thus, the indication causes each leaf to coordinate the updating of the document-sharded portions of the index with the term-sharded portions. Because at query serving time a particular leaf may receive the change information with the term-sharded posting lists stored on other leaves at query time, the particular leaf has the ability to determine whether to apply the delta or not for the documents assigned to the particular leaf. Thus, the leaves can serve different versions of the repository with document atomicity.

Figure 7:
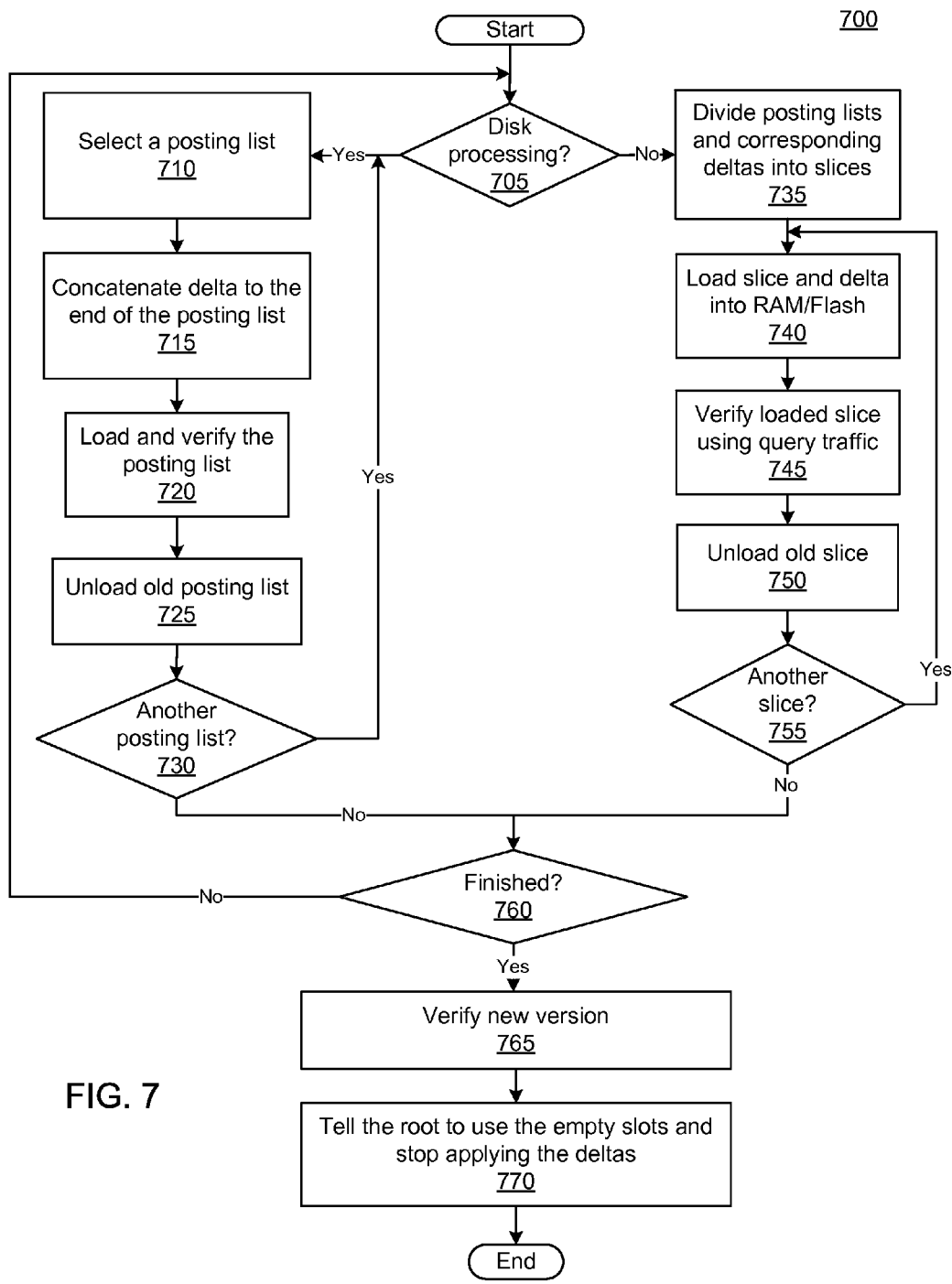
FIG. 7 illustrates an example process for swapping old term-sharded posting lists for new term-sharded posting lists as part of an update of a hybrid-sharded, distributed inverted index.

FIG. 7 illustrates an example process 700 for swapping term-sharded posting lists as part of an update of a hybrid-sharded, distributed inverted index. Process 700 may take place at a leaf node as part of step 345 of FIG. 3. The leaf node may employ two update paths, one for term-sharded posting lists stored on disk or other forms of slower-access memory, and one for term-sharded posting lists stored in faster access memory, such as RAM, flash, cache, etc. In the slower-access memory path (705, Yes), the leaf may select one of the posting lists (710) and append the change information file with an inverse translation table to the end of the full posting list (715) that was concatenated from portions of the posting list from other leaves. Adding the change information allows the leaf to avoid an extra disk seek to fetch this information when serving queries during the update. The posting list, with the appended change information, may then be loaded into memory and verified (720). For example, the leaf may begin sending some of the query requests to the updated posting list. This may enable the leaf to detect problems with the update early on, before a failure that could cause the leaf to crash. The leaf may then unload the old posting list (725). The leaf may repeat this process for any other posting lists stored in the slower-access memory (730, Yes).

If the posting list is stored in faster-access memory (705, No), the leaf node may divide the posting lists and their corresponding change information into slices. In some implementations, the leaf may divide the posting lists into roughly 8 to 16 slices, each of which can be loaded independently into memory. The leaf may determine the slices so that the leaf knows which slice a particular term and document identifier are assigned to. In some implementations, the leaf may load one slice and its corresponding change information, or delta file, into memory. The slices currently being served may remain in place, but the leaf may begin sending query traffic to the new slice and its change information because the change information allows the leaf to convert the information in the new slice back to the old information. In some implementations the system may begin sending query traffic over slowly, monitoring for problems or performing other verification processes. In this manner, the leaf may proceed as cautiously as needed to avoid failures caused by the update. When the leaf is satisfied that the loaded slice is working, the leaf may unload the old slice (740). Although the old slice is unloaded, the leaf is still converting the updated slice back to the old slice by applying the delta file. The leaf may then repeat steps 735 to 745 with a next slice (750, Yes) until all slices have been loaded (750, No). In some implementations a leaf may perform the slower-access memory process, steps 710 to 730, and the faster-access memory process, steps 735 to 755 concurrently.

When all swapping is complete, for posting lists stored in the slower and the faster access memory (760, Yes), the leaf may perform additional verification (765). For example, the leaf may allow some queries to use the updated repository, i.e., by not applying the change information, to verify that the leaf can retrieve certain documents. When verification is complete, the leaf may notify the root that the swap is complete begin using the updated posting lists by ignoring the delta information for term-sharded posting lists and using the spare leaf with the updated document-sharded posting lists. In some implementations, the root may store a flag or bit or some other indication of whether a leaf is serving the old or updated version of the index. Thus, in some implementations when a leaf has finished the swap, the root may set or update the indicator for the leaf. After all leaves have finished the swap, the update is complete.

If for some reason a leaf fails during an update, the change information may be used to speed recovery of the index. For example, in an implementation where the change information files are sent to a shared memory location, the system may write these files to persistent storage. In other implementations the leaf that produced the delta file or the leaf that receives the delta file may store the file to persistent storage. In other words, the system may keep the delta files even if the system is no longer using the delta files. If a leaf fails to produce its delta during an update, the remaining leaves can proceed to process the rest of the updates and the failed leaf can revert back to using the old version of the index until the problem is resolved. If a leaf fails after the shuffle, the leaf can re-request the delta files from persistent storage. When the failed leaf knows the version it is currently serving, the failed leaf can apply one or more of the stored delta files to recover the index to a point that will not fail. In this manner, some implementations may use the information generated during an update to recover from failures, enhancing the system reliability and availability.

Figure 8:
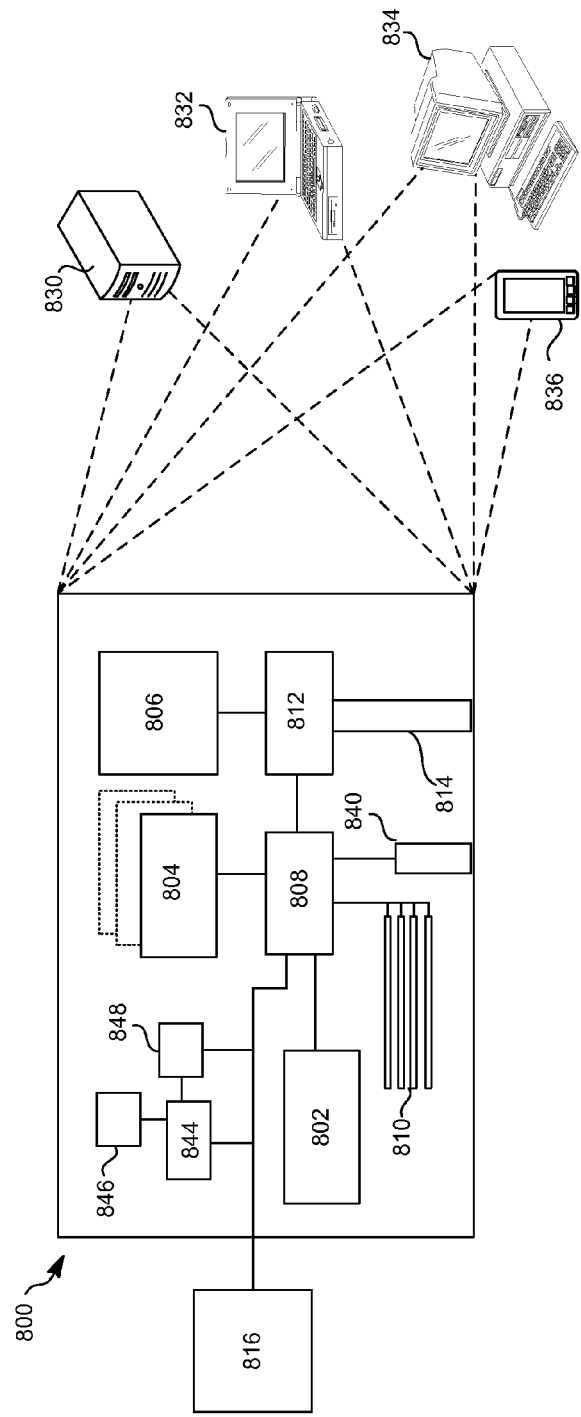
FIG. 8 shows an example of a computer device that can be used to implement the described techniques.

FIG. 8 shows an example of a generic computer device 800, which may be system 100, client 170, and/or a host of websites 190 of FIG. 1, which may be used with the techniques described here. Computing device 800 is intended to represent various example forms of computing devices, such as laptops, desktops, workstations, personal digital assistants, cellular telephones, smart phones, tablets, servers, and other computing devices, including wearable devices The components shown here, their connections and relationships, and their functions, are meant to be exemplary only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a personal computer such as a laptop computer 822, or smart phone 836. An entire system may be made up of multiple computing devices 800 communicating with each other. Other configurations are possible.

FIG. 9 shows an example of a generic computer device 900, which may be system 100 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be exemplary only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980b, 980c, and 980d, and these may collectively be known as system 100. As another example, system 100 of FIG. 1 may include one or more computing devices 900 as indexing system 110, a separate computing device 900 as query server 120, and one or more computing devices 900 as index serving cluster 160. Furthermore, some of the computing devices may be located geographically close to each other, and others may be located geographically distant. The layout of system 900 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor but not to transitory signals.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   distributed computing devices represented by leaf nodes;
   memory storing an index of documents, the index being distributed across multiple computing devices, the documents being assigned to respective computing devices, and wherein a first document is in a first set of documents assigned to a first leaf node and a second document is in a second set of documents assigned to the first leaf node, the first document being a base document, wherein:
      terms in the first document are identified as document sharded and posting lists for the terms in the first document are stored in fast memory at the first leaf node, and
      posting lists for at least some terms in the second document that are term sharded and stored at computing devices other than the first leaf node; and
   at least one root computing device that includes:
      at least one processor,
      memory storing instructions that, when executed by the at least one processor, cause the root computing device to map documents to computing devices and map term-sharded terms to computing devices, and memory storing instructions that, when executed by the at least one processor cause the system to access posting lists from the index in response to queries.

2. The system of claim 1 wherein the posting lists for at least some terms in the second document are document-sharded rather than term-sharded, and are stored on the computing device that stores the second document.

3. The system of claim 2 wherein the posting lists for document-sharded term are stored in fast access storage.

4. The system of claim 1 wherein the terms that are document-sharded from the second document are common terms.

5. The system of claim 1 wherein accessing posting lists comprises, in response to a query having at least a first query term and a second query term, the second query term corresponding to one of the term-sharded terms:
retrieving a posting list for the second query term from one of the computing devices, wherein the retrieved posting list indexes occurrences of the second query term in documents stored on multiple different computing devices of the distributed computing devices; and
retrieving posting lists for the first query term from some of the multiple different computing devices, wherein the retrieved posting lists index occurrences of the first query term in documents that are co-located on the computing device that stores the respective posting list.

6. The system of claim 5, wherein references to documents in the posting list for the second query term are organized by computing device to which the documents are assigned.

7. The system of claim 1, wherein the memory further stores instructions that, when executed by the at least one processor, cause the system to generate search results responsive to accessing the posting lists, wherein generating search results includes:
receiving a query at the root computing device, the query having at least a first query term and a second query term;
determining that the second query term is term sharded;
obtaining a posting list for the second query term from a computing device to which the second query term is assigned; and
sending at least a portion of information in the obtained posting list to at least another computing device for intersection with a posting list for the first query term.

8. The system of claim 7, wherein generating search results further comprises:
receiving scores for documents from the another computing device, the documents being relevant to the first query term and identified by the obtained posting list.

9. The system of claim 7, wherein, at the another computing device, information about (i) the first query term, (ii) the second query term, and (iii) a portion of the posting list for the second query term that was obtained from the computing device to which the second query term is assigned, is received and used to identify documents in the first set relevant to the query and documents in the second set relevant to the query.

10. The system of claim 1, wherein each of the term-sharded terms is assigned to a respective leaf node of the leaf nodes.

11. A data storage system comprising:
a plurality of leaf computing devices in a distributed system;
a root computing device in communication with the plurality of leaf computing devices,
wherein at least one of the leaf computing devices includes:
memory, at least some of which is fast-access memory, and at least some which is disk memory, the memory being configured in arrays; and
processors for accessing the memory and processing posting lists stored in the memory, each array being accessible at least to one or more processors of the at least one leaf computing device,
and wherein the memory stores:
documents assigned to the at least one leaf computing device,
document-sharded posting lists for terms appearing in documents of a first set of the documents, the document-sharded posting lists being stored in the fast-access memory, and
term-sharded posting lists for terms appearing in remaining documents, the terms being assigned to respective leaf computing devices of the plurality of leaf computing devices regardless of the leaf computing device assignment of documents in which the terms appear, the term-sharded posting lists being stored primarily in the disk memory, wherein within each term-sharded posting list, references to documents are organized by the leaf computing device to which the documents are assigned.

12. The system of claim 11, wherein a document portion of the term-sharded posting lists are pre-split into groups, each group being associated with a respective leaf computing device of the plurality of leaf computing devices, and wherein the root computing device includes:
at least one processor; and
memory storing instructions that, when executed by the at least one processor, cause the root computing device to perform operations comprising:
receiving a query, the query including a first term and a second term, the second term being term-sharded;
retrieving the posting list for the second term from a second leaf computing device of the plurality of leaf computing devices, the second leaf computing device being associated with the second term;
determining, based on the groups appearing in the posting list for the second term, a set of leaf computing devices to which documents in the posting list for the second term appear;
sending a request to the set of leaf computing devices to determine documents responsive to the query; and
generating a search result from responses received from responses to the request.

13. The system of claim 11, wherein terms in the term-sharded posting list are stored in the fast-access memory when the terms meet a term-popularity threshold.

14. The system of claim 11, wherein a particular term has at least one document-sharded posting list and one term-sharded posting list.

15. The system of claim 11, wherein terms failing to meet a minimum posting list length are included in term-sharded posting lists rather than document-sharded posting lists.

16. The system of claim 11, wherein terms that meet a term popularity threshold that appear in the remaining documents are stored in the fast-access memory.

17. A method comprising:
receiving, using at least one processor of a root node in a distributed environment, a query having a first term and a second term;
determining, using the at least one processor of the root node, that the first term is term-sharded;
retrieving a term-sharded posting list for the first term from a first leaf node that stores the term-sharded posting list, the first leaf node being one of a plurality of leaf nodes in the distributed environment;
determining, using the at least one processor of the root node, a second leaf node from the plurality of leaf nodes that stores a document-sharded posting list for the second term;
sending the second term and a sub-set of documents from the term-sharded posting list to the second leaf node, the sub-set being documents assigned to the second leaf node; and
generating a search result using a response received from the second leaf node.

18. The method of claim 17, further comprising:
determining a third leaf node from the plurality of leaf nodes that stores a document-sharded posting list for the second term;
sending the second term and a second sub-set of documents from the term-sharded posting list to the third leaf node, the sub-set being documents assigned to the third leaf node;
aggregating, using the at least one processor of the root node, results from the second leaf node and the third leaf node; and
generating the search result using the aggregated results.

19. The method of claim 17, wherein the term-sharded posting list includes, for a document identified in the term-sharded posting list, an indication of a leaf node from the plurality of leaf nodes that the document is associated with.

20. The method of claim 17, wherein determining that the first term is term-sharded includes determining that the first term appears in fewer documents than the second term.

21. The method of claim 17, wherein the term-sharded posting list is a first term-sharded posting list and the query has a third term and the method further includes:
determining, using the at least one processor of the root node, that the third term is term-sharded;
retrieving a second term-sharded posting list for the third term from a third leaf node that stores the second term-sharded posting list, the third leaf node being a different one of the plurality of leaf nodes in the distributed environment than the first leaf node; and
aggregating, using the at least one processor of the root node, the first term-sharded posting list and the second term-sharded posting list to generate the sub-set of documents, so that the sub-set of documents includes documents from the first term-sharded posting list and the second-term-sharded posting list.

22. The method of claim 21, the method further comprising:
performing lightweight scoring on documents identified in the first term-sharded posting list and the second term-sharded posting list prior to sending the sub-set of documents to the second leaf node.

23. The method of claim 17, wherein the second leaf node scores documents included in the response prior to sending the response to the root node.

* * * * *